US011955688B2

(12) United States Patent
Wei et al.

(10) Patent No.: US 11,955,688 B2
(45) Date of Patent: Apr. 9, 2024

(54) HEATSINK FOR MILLIMETER WAVE (MMW) AND NON-MMW ANTENNA INTEGRATION

(71) Applicant: QUALCOMM Incorporated, San Diego, CA (US)

(72) Inventors: Cheng-Fan Wei, New Taipei (TW); Chao-Kuei Chang, Taipei (TW); Yi-Hsiang Kung, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/484,317

(22) Filed: Sep. 24, 2021

(65) Prior Publication Data

US 2023/0096131 A1 Mar. 30, 2023

(51) Int. Cl.
*H01Q 5/307* (2015.01)
*H01Q 1/02* (2006.01)
*H01Q 3/36* (2006.01)
*H01Q 7/00* (2006.01)
*H01Q 9/30* (2006.01)

(52) U.S. Cl.
CPC ................. *H01Q 1/02* (2013.01); *H01Q 3/36* (2013.01); *H01Q 7/00* (2013.01); *H01Q 9/30* (2013.01)

(58) Field of Classification Search
CPC ............... H01Q 1/02; H01Q 3/36; H01Q 9/30
See application file for complete search history.

(56) References Cited

U.S. PATENT DOCUMENTS

2005/0116870 A1* 6/2005 Wang ..................... H01Q 13/10 343/702
2011/0279338 A1 11/2011 Myszne et al.
2017/0052953 A1 2/2017 Imbruce et al.
2017/0062953 A1* 3/2017 Teshima .................. H01Q 9/42
2019/0006731 A1* 1/2019 Chiu .................... H01Q 21/065
2019/0260127 A1 8/2019 Shi et al.
(Continued)

FOREIGN PATENT DOCUMENTS

WO 2021078009 A1 4/2021

OTHER PUBLICATIONS

International Search Report and Written Opinion—PCT/US2022/075925—ISA/EPO—dated Nov. 28, 2022.

*Primary Examiner* — Awat M Salih
(74) *Attorney, Agent, or Firm* — Polsinelli/Qualcomm Incorporated

(57) ABSTRACT

Aspects described herein include devices, wireless communication apparatuses, methods, and associated operations for heatsinks integrating millimeter wave and non-millimeter wave operation. In some aspects, an apparatus comprising a millimeter wave (mmW) module is provided. The apparatus includes at least one mmW antenna and at least one mmW signal node configured to communicate a data signal in association with the at least one mmW antenna. The apparatus further includes mixing circuitry configured to convert between the data signal and a mmW signal for communications associated with the at least one mmW antenna. The apparatus further includes a heatsink comprising a non-mmW antenna and a non-mmW feed point coupled to the non-mmW antenna. The non-mmW feed point is configured to provide a signal path to the non-mmW antenna for a non-mmW signal. The heatsink is mechanically coupled to the mmW module.

30 Claims, 16 Drawing Sheets

(56) References Cited

U.S. PATENT DOCUMENTS

| | | | | |
|---|---|---|---|---|
| 2020/0295914 | A1* | 9/2020 | Hormis | H04W 72/0446 |
| 2021/0234250 | A1* | 7/2021 | Migliorino | H01Q 9/42 |
| 2021/0235575 | A1* | 7/2021 | Wang | H05K 1/181 |
| 2021/0328367 | A1* | 10/2021 | Tang | H01L 24/24 |
| 2021/0359389 | A1* | 11/2021 | Wang | H01Q 1/246 |
| 2022/0045712 | A1* | 2/2022 | Berhane | H04B 1/525 |

* cited by examiner

1x8 array on a Module

HEATSINK FOR MILLIMETER WAVE (MMW) AND NON-MMW ANTENNA INTEGRATION

FIELD

The present disclosure relates generally to electronics and wireless communications, and more specifically to antennas for use with such wireless communications.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device. Supporting different wavelengths for wireless communications can involve managing complex interactions among device elements while managing interactions and interference between elements supporting communications on the different wavelengths.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Aspects described herein include heatsinks for wireless devices with a millimeter wave (mmW) module including one or more antennas for communications at frequencies above 20 gigahertz (GHz) (e.g., above approximately 24 GHz), as well as an antenna for non-mmW communications where the non-mmW antenna is at least a portion of a structure used for heat dissipation in the heatsink. The power involved in mmW communications and the compact size of a mmW module can result in significant heat generation by the mmW module. In some such modules, a heatsink can be used to dissipate the heat generated by the mmW module. Such a heatsink can consume significant amounts of space in a device environment where space is an important and limited resource. Aspects described herein include devices which integrate a heatsink structure designed to dissipate heat from a mmW module with a non-mmW antenna formed by at least a portion of the heatsink. Such devices can provide improved device performance in the form of additional functionality provided by an additional antenna, improved heat dissipation using a heatsink with a mmW module, and/or a compact device structure by using at least a portion of the heatsink as a non-mmW antenna.

In some aspects, a device is provided, comprising a millimeter wave (mmW) module comprising: at least one mmW antenna; at least one mmW signal node configured to communicate a data signal in association with the at least one mmW antenna; mixing circuitry configured to convert between the data signal and a mmW signal for communications associated with the at least one mmW antenna; and a heatsink comprising a non-mmW antenna, the heatsink further comprising a non-mmW feed point coupled to the non-mmW antenna to provide a signal path to the non-mmW antenna for a non-mmW signal, wherein heatsink is mechanically coupled to the mmW module.

In some aspects, the at least one mmW antenna is configured to radiate in a first effective beam width from a first side of the mmW module, and wherein the non-mmW antenna is structured with a gap positioned at the first side of the mmW module.

In some aspects, the at least one mmW antenna is configured to radiate mmW signals in the first effective beam width at frequencies greater than 20 gigahertz, and wherein the non-mmW antenna is configured to radiate at frequencies less than 7 gigahertz without interfering with the mmW signals in the first effective beam width.

In some aspects, the heatsink is physically coupled to two or more sides of the mmW module other than the first side using a heat dispersion adhesive.

In some aspects, the heatsink is mechanically coupled to the mmW module to facilitate heat transfer from the mmW module to the non-mmW antenna.

In some aspects, the heatsink is mechanically coupled to the mmW module using a heat dispersion adhesive.

In some aspects, the heatsink is configured to dissipate heat received from the mmW antenna via one or more conductors used to transmit the non-mmW signal.

In some aspects, the heatsink comprises an integral metal structure.

In some aspects, the heatsink is physically connected to a thermal dissipation medium and configured to transfer thermal energy received from the mmW module to the thermal dissipation medium via conduction.

In some aspects, the thermal dissipation medium is air around the non-mmW antenna.

In some aspects, the non-mmW antenna is a quarter wavelength slot antenna with a radiating structure formed by a gap between the heatsink and a frame metal with the feed point structured across the gap between the heatsink and the frame metal.

In some aspects, the non-mmW antenna is an inverted-F antenna comprising a ground plane coupled to a first side of the mmW module and conductors coupled to the ground plane and at least a second side of the mmW module different from the first side of the mmW module.

In some aspects, the non-mmW antenna is a positioning system antenna configured to receive Global Navigation Satellite System signals at approximately 1.575 gigahertz.

In some aspects, the at least one mmW antenna includes a plurality of antennas of an antenna array; wherein the mmW module further comprises phase shifting circuitry for each antenna of the of antennas configurable to transmit or receive a beamformed beam in an effective beam width range.

In some aspects, the mmW module further comprises power management circuitry and mmW circuitry, wherein the power management circuitry is configured to supply system voltages the mmW circuitry.

In some aspects, the non-mmW antenna includes a conductor physically coupled to the mmW module, wherein the conductor has a length of approximately 24.1 millimeters.

In some aspects, the non-mmW antenna is a quarter wavelength monopole antenna.

In some aspects, the non-mmW antenna is a half wavelength loop antenna.

In some aspects, a method of operating a wireless communication apparatus is provided. The method comprises receiving, at a millimeter wave (mmW) signal node of a mmW module, a mmW signal, the mmW module comprising at least one mmW antenna; receiving, at a non-mmW antenna, a non-mmW signal, wherein heatsink is mechanically coupled to the mmW module at a physical interface;

receiving, by the non-mmW antenna via the physical interface, thermal energy from the mmW module; and dissipating, utilizing a heatsink comprising the non-mmW antenna, the thermal energy received from the mmW module via conduction to a thermal dissipation medium.

In some aspects, the mmW signal is relayed from the at least one mmW antenna to communication circuitry of the mmW module via the mmW signal node.

In some aspects, the mmW signal is transmitted via the at least one mmW antenna.

In some aspects, the non-mmW signal is received at the non-mmW antenna from a non-mmW signal feed for wireless transmission via the non-mmW antenna.

In some aspects, the non-mmW signal is a wireless global positioning system (GPS) signal received at the non-mmW antenna, and routed to GPS circuitry of the wireless communication apparatus via a non-mmW feed.

In some aspects, the mmW signal is a reflection of a radar signal received at the mmW antenna, and routed to radar circuitry of the wireless communication apparatus.

In some aspects, the thermal dissipation medium is air around the non-mmW antenna.

In some aspects, the thermal dissipation medium is a heat transfer fluid configured to transfer thermal energy from the non-mmW antenna.

In some aspects, the physical interface comprises a thermally conductive adhesive physically binding portions of one or more surfaces of the heatsink to portions of one or more surfaces of the mmW module.

Another aspect of the disclosure provides for an apparatus. The apparatus comprises means for receiving a mmW signal; means for jointly receiving a non-mmW signal while dissipating thermal energy received from the means for receiving the mmW signal via thermal conduction.

Some aspects further comprise a thermally conductive adhesive used to physically attach portions of one or more surfaces of the means for receiving the mmW signal to portions of one or more surfaces of the means for jointly receiving the non-mmW signal while dissipating the thermal energy received from the means for receiving the mmW signal.

In some aspects, the apparatuses described above can include a mobile device with a camera for capturing one or more pictures. In some aspects, the apparatuses described above can include a display screen for displaying one or more pictures. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
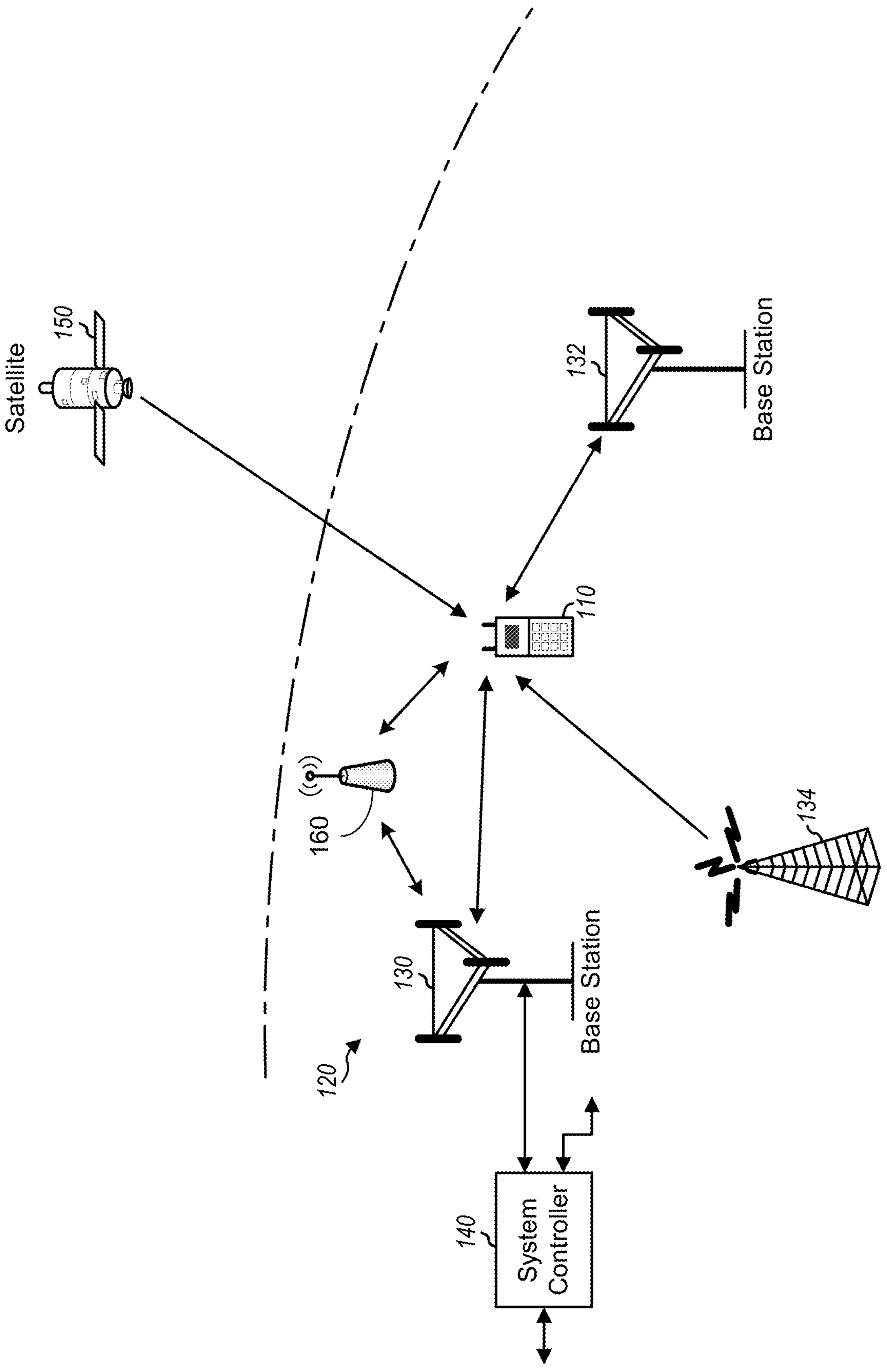
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Standard form factors for devices such as cell phones, tablets, laptop computers, cellular hotspot devices, and other such devices are subject to increasingly limited space. At the same time, additional wireless communication systems are being integrated into such devices. Performance and space tradeoffs are design considerations in all such devices. Millimeter wavelength (mmW) modules that include mmW circuitry, e.g., transmission (Tx) and receive (Rx) elements for mmW communications, are subject to significant power usage and associated heat generation. Metal heatsink structures used with mmW modules consume space resources for heat dispersion, and can interfere with non-mmW wireless performance due to interference with non-mmW electromagnetic signals.

Aspects described herein include devices with heatsinks configured for integration of millimeter wave (mmW) and non-mmW antennas. Aspects include devices with modified heatsinks with an added data feed (e.g., a connection point for receiving non-mmW signals for wireless communication and/or services) and by structuring the heatsink such that at least a portion functions as an antenna for non-mmW signals. The heatsink can be jointly structured for both dissipation of thermal energy and antenna operation for non-mmW frequencies. In some aspects, the heatsink is physically coupled to a mmW module that includes one or more mmW antennas. In some cases, the heatsink is structured as an antenna to transmit in a given non-mmW set of frequencies (e.g., frequencies less than approximately 20 gigahertz (GHz), for example approximately 7 GHz or below, frequencies at or around approximately 1.6 GHz, frequencies at or around approximately 1.1 GHz, etc.). Similarly, the mmW module may include one or more antennas configured to transmit or receive mmW signals at frequencies greater than approximately 20 GHz.

Such a device with a heatsink integrating a non-mmW antenna with a mmW module may improve the performance of the device with efficient usage of space. In some aspects, some such devices can leverage space efficiency where the combination of a heatsink and non-mmW antenna are integrated into a single heatsink element including the non-mmW antenna to add additional functionality in a given design space. Additional device improvements will be apparent from the descriptions provided herein.

FIG. 1 is a diagram showing a wireless device 110 communicating with a wireless communication system 120. In accordance with aspects described herein, the wireless device can include mmW and non-mmW communication elements with implementations of a heatsink integrating a mmW module with a non-mmW antenna. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. Communication elements of the wireless device 110 for implementing mmW and non-mmW communications in accordance with any such communication standards can be supported by various designs of a heatsink in accordance with aspects described herein. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1×, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be referred to as a customer premises equipment (CPE), which may be in communication with a base station 130 and a wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
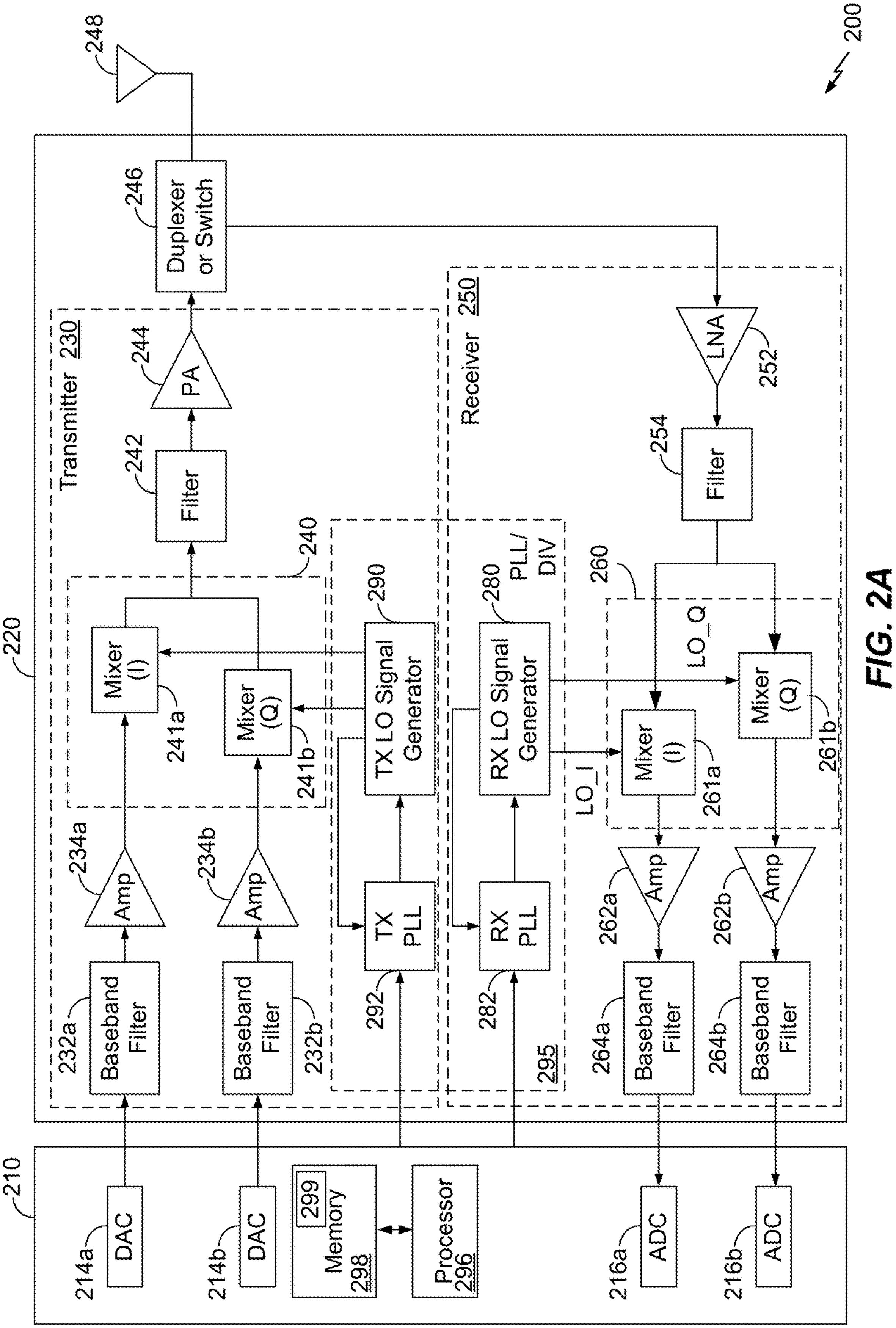
FIG. 2A is a block diagram showing portions of a wireless device in which aspects the present disclosure may be implemented.

FIG. 2A is a block diagram showing a wireless device 200 in which aspects of the present disclosure may be implemented. The wireless device 200 may, for example, be an embodiment of the wireless device 110 illustrated in FIG. 1.

In some examples, the wireless device 200 (or any of the devices or elements illustrated in any of FIGS. 2A-2C) may be an example of any of the devices illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214*a* and 214*b* for converting digital signals generated by the data processor 210 into the I and Q analog output signals, e.g., I and Q output currents, for further processing. In other embodiments, the DACs 214*a* and 214*b* are included in the transceiver 220 and the data processor 210 provides data (e.g., for I and Q) to the transceiver 220 digitally.

Within the transmitter 230, bandpass (e.g., lowpass) filters 232*a* and 232*b* filter the I and Q analog transmit signals, respectively, to remove undesired images caused by the prior digital-to-analog conversion. Amplifiers (Amp) 234*a* and 234*b* amplify the signals from bandpass filters 232*a* and 232*b*, respectively, and provide I and Q baseband signals. An upconverter 240 having upconversion mixers 241*a* and 241*b* upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier 244 amplifies the signal from filter 242 to obtain the desired output power level and provides a transmit RF signal. The transmit RF signal is routed through a duplexer or switch 246 and transmitted via an antenna array 248. While examples discussed herein utilize I and Q signals, those of skill in the art will understand that components of the transceiver may be configured to utilize polar modulation.

In the receive path, the antenna array 248 receives communication signals and provides a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by baseband (e.g., lowpass) filters 264*a* and 264*b* to obtain I and Q analog input signals, which are provided to data processor 210. In the exemplary embodiment shown, the data processor 210 includes analog-to-digital-converters (ADC's) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the power amplifier 244 and LNA 252 (and filter 242 and/or 254 in some examples) may be implemented separately from other components in the transmitter 230 and receiver 250, and may be implemented on a millimeter wave integrated circuit. An example super-heterodyne architecture is illustrated in FIG. 2B.

Figure 2B:
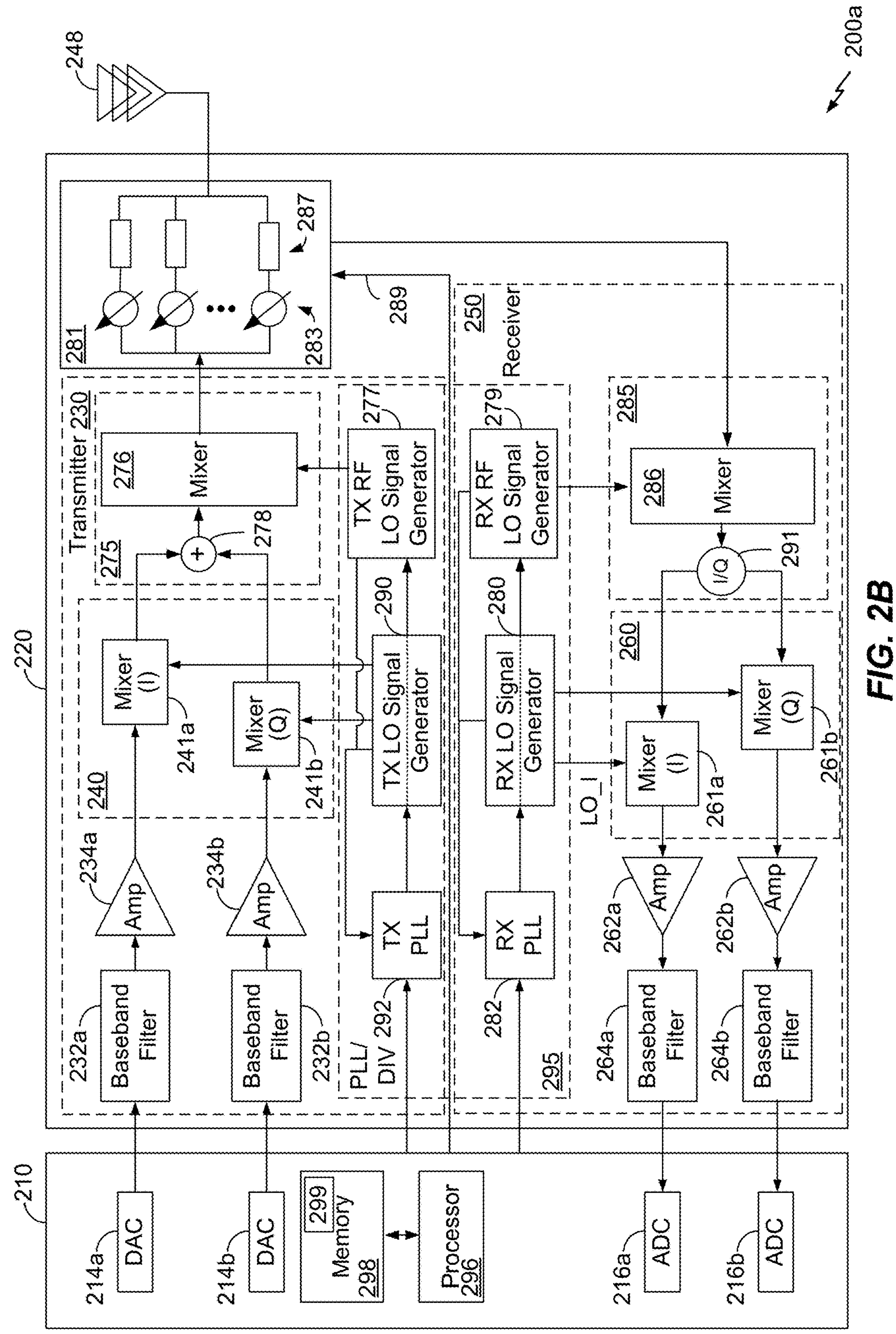
FIG. 2B is a block diagram showing portions a wireless device in which aspects of the present disclosure may be implemented.

FIG. 2B is a block diagram showing a wireless device in which aspects of the present disclosure may be implemented. Certain components, for example which may be indicated by identical reference numerals, of the wireless device 200*a* in FIG. 2B may be configured similarly to those in the wireless device 200 shown in FIG. 2A and the description of identically numbered items in FIG. 2B will not be repeated.

The wireless device 200*a* is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted mmW signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 289 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the mmW transmit signal from the upconverter 275, alter the phase by an amount, and provide the mmW signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive mmW signal provided by the phase shift circuitry 281 to an IF signal according to RX mmW LO signals provided by an RX mmW LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from mmW and signals that have been downconverted from mmW to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B.

Figure 2C:
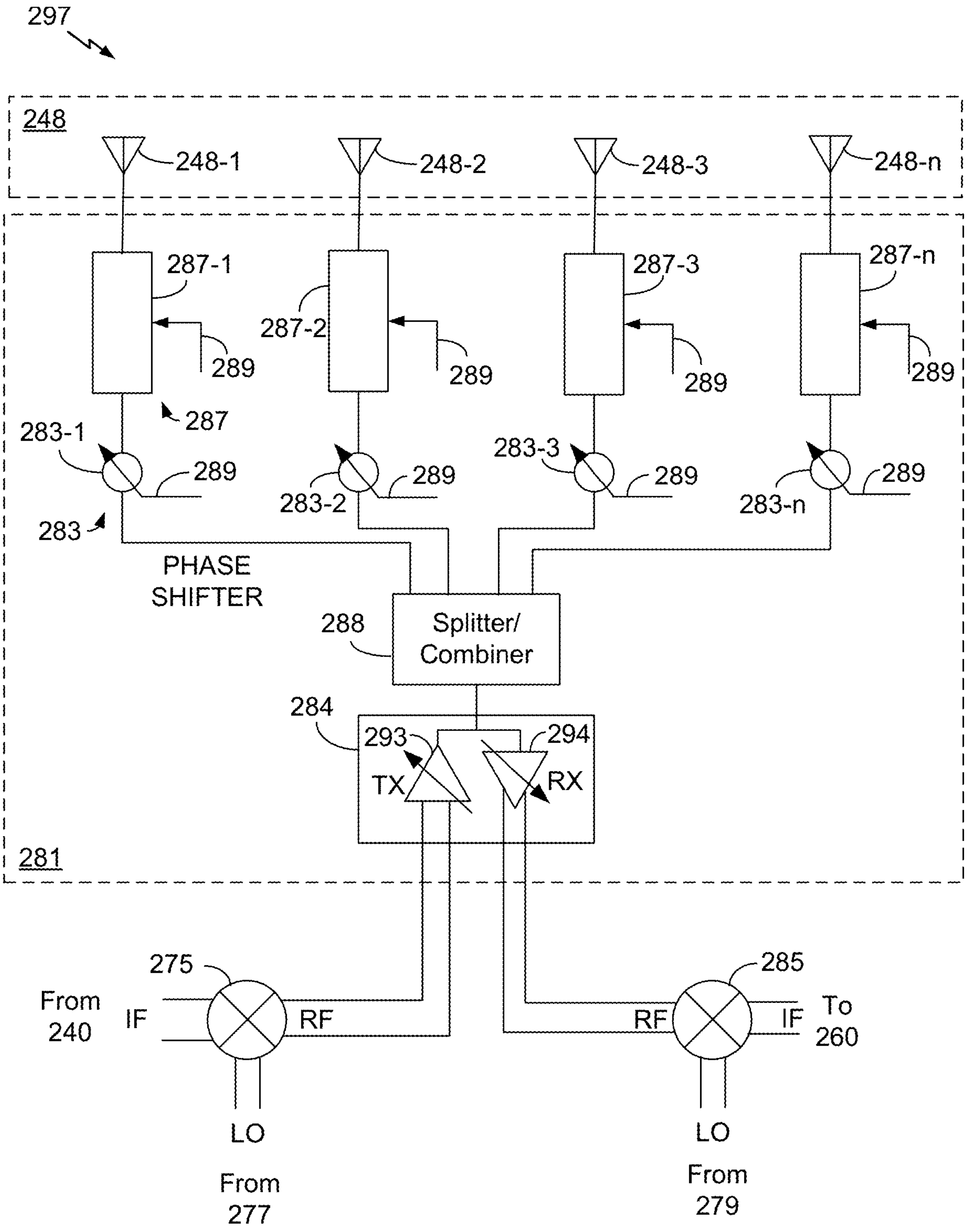
FIG. 2C is a block diagram illustrating aspects of a wireless device in which aspects of the present disclosure may be implemented.

FIG. 2C is a block diagram 297 showing in greater detail an embodiment of some of the components of FIG. 2B. In an exemplary embodiment, the upconverter 275 provides an mmW transmit signal to the phase shift circuitry 281 and the downconverter 285 receives an mmW receive signal from the phase shift circuitry 281. In an exemplary embodiment, the phase shift circuitry 281 comprises an mmW variable gain amplifier (VGA) 284, a splitter/combiner 288, the phase shifters 283 and the phased array elements 287. In an exemplary embodiment, the phase shift circuitry 281 may be implemented on a millimeter-wave integrated circuit (mmWIC). In some such embodiments, the upconverter 275 and/or the downconverter 285 (or just the mixers 276, 286) are also implemented on the mmWIC. In an exemplary embodiment, the mmW VGA 284 may comprise a TX VGA 293 and an RX VGA 294. In some embodiments, the TX VGA 293 and the RX VGA 294 may be implemented independently. In other embodiments, the VGA 284 is bidirectional. In an exemplary embodiment, the splitter/combiner 288 may be an example of a power distribution network and a power combining network. In some embodiments, the splitter/combiner 288 may be implemented as a single component or as a separate signal splitter and signal combiner. The phase shifters 283 may be coupled to respective phased array elements 287. Each respective phased array element 287 is coupled to a respective antenna element in the antenna array 248. In an exemplary embodiment, phase shifters 283 and the phased array elements 287 receive control signals from the data processor 210 over connection 289. The exemplary embodiment shown in FIG. 2C comprises a 1×4 array having four phase shifters 283-1, 283-2, 283-3 and 283-*n*, four phased array elements 287-1, 287-2, 287-3 and 287-*n*, and four antennas 248-1, 248-2, 248-3 and 248-*n*. However, a 1×4 phased array is shown for example only, and other configurations, such as 1×2, 1×6, 1×8, 2×3, 2×4, or other configurations are possible.

Examples illustrated with respect to FIGS. 2B and 2C implement phase shifting (e.g., using phase shifters 283) in a signal path of the wireless device 200*a*. In other examples, the phase shifters 283 are omitted, and a phase of a signal may be adjusted by varying a phase at the mixers 276, 286. In some examples, the LO signal generators 277, 279 are configured to provide oscillating signals having varied phase in order to produce TX and/or RX signals having different phases. In some such examples, more than one mixer is implemented for the TX path and/or the RX path in the circuitry 281.

The circuitry of FIGS. 2B and 2C can, in some implementations, generate sufficient heat to cause operation problems for a device if the heat is not appropriately dissipated. One device configuration is to attach a metallic heatsink to a mmW module supporting mmW communications, with a separate and distinct non-mmW antenna implemented in the device separate from the heatsink to prevent the heatsink from interfering with operation of the non-mmW antenna while providing sufficient heat transfer and dissipation to manage heat generated by the mmW module.

Figure 3A:
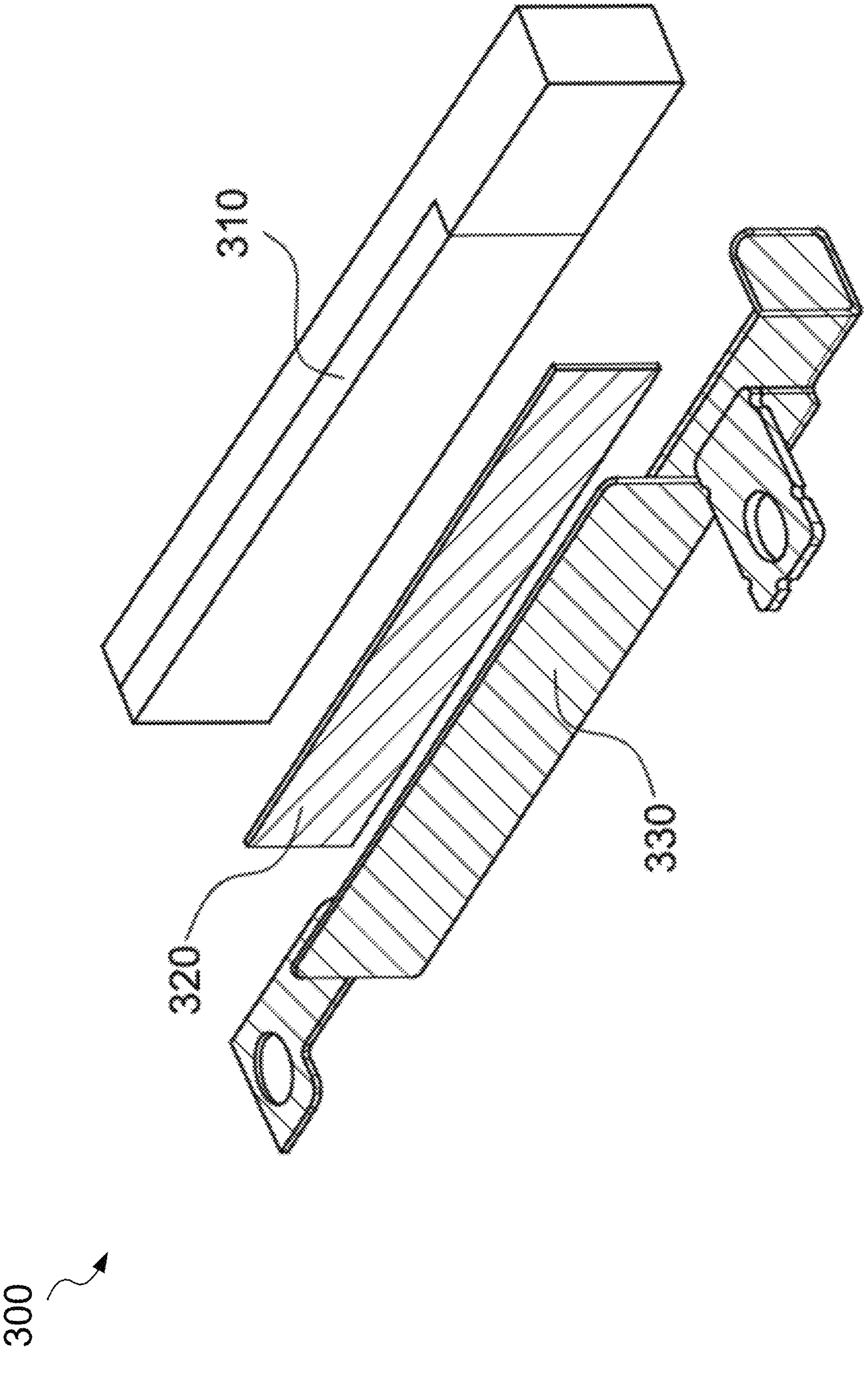
FIG. 3A is a diagram illustrating aspects of a heatsink and a mmW module for integration of mmW and non-mmW antennas in accordance with aspects described herein.
Figure 3B:
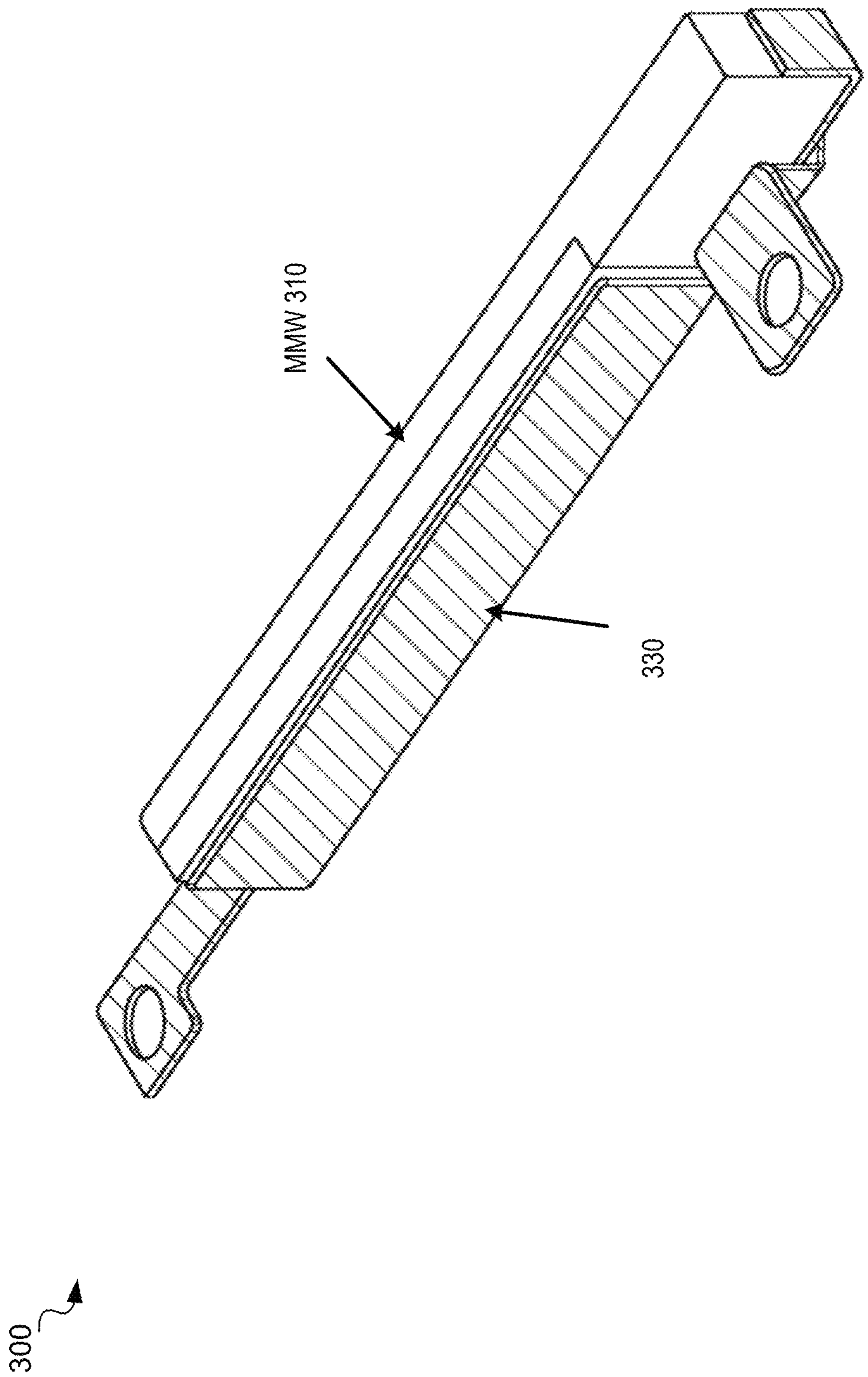
FIG. 3B is a diagram illustrating aspects of a heatsink and a mmW module for integration of mmW and non-mmW antennas in accordance with aspects described herein.

FIG. 3A is a diagram illustrating aspects of a heatsink 330 and a mmW module 310 for integration of mmW and non-mmW antennas in an apparatus 300 in accordance with aspects described herein. FIG. 3B is an additional diagram illustrating aspects of the heatsink 330 and the mmW module 310 for integration of mmW and non-mmW antennas in accordance with aspects described herein. FIG. 3A particularly shows an exploded view of separate parts of apparatus 300 that are in physical contact when implemented in a device, to clarify the structure of the example components of apparatus 300. FIG. 3B shows a connected view where apparatus 300 is assembled with the heat dispersion adhesive 320 not visible at selected physical contact interfaces between the mmW module 310 and the heatsink 330.

As shown, the apparatus 300 includes the mmW module 310, the heat dispersion adhesive 320, and the heatsink 330 which is structured as a non-mmW antenna. The mmW module 310 includes one or more mmW antennas for enabling mmW communications, as well as additional supporting circuitry, which can include various aspects of the circuitry described above in FIGS. 2B and 2C. Additional details of internal structures of mmW modules such as the mmW module 310 are discussed below with respect to FIGS. 8A, 8B, 8C, and 8D.

The apparatus 300 additionally may include various forms of the heat dispersion adhesive 320. In some aspects, the apparatus 300 includes a thermally conductive epoxy adhesive as the heat dispersion adhesive 320. Such epoxy adhesives can include silicone epoxies, polyurethane epoxies, and other such epoxy materials, which can be selected based on the expected thermal environment and desired thermal transfer characteristics. Some thermal conductive epoxies in accordance with aspects described herein have a thermal conductivity of approximately 0.5 Watts per square meter (W/mK) (e.g., between approximately 0.4 and 0.6 W/mK). High performance thermal epoxies may have thermal conductivity over 1.5 W/mK (e.g., between 1.5 and 3 W/mK) in some implementations. In some implementations, a heat dispersion adhesive 320 can be combined with a non-adhesive thermal material to further improve heat transfer performance with a pattern of adhesive combined with non-adhesive thermal transfer material. Such non-adhesive thermal transfer materials (e.g., thermal paste, thermal grease, etc.) can have thermal conductivity characteristics up to approximately 70 W/mK using filler materials such as zinc oxide, ceramics, aluminum, copper, silver, graphite, and/or carbon nanoparticles along with other materials. In different implementations, electrically conductive or electrically non-conductive adhesives can be used, or combinations of such adhesives can be used based on a particular design and antenna operation to prevent mmW and non-mmW antennas from interfering with each other. Some such epoxies can include silver filled epoxy, graphite filled epoxy, or other such conductive epoxies. In some aspects, the heat dispersion adhesive 320 can be a thermally conductive tape material. In other aspects, other such adhesives can be used, or combinations of various adhesives can be used.

In some aspects of such an apparatus, the heat dispersion adhesive 320 is optional, or alternative heat dispersion materials can be used. In some aspects, a non-adhesive conductive material can be used at portions of the physical connection between the mmW module 310 and the heatsink 330. In such aspects, the apparatus can use alternative methods of maintaining a connection between the mmW module 310 and heatsink 330, such as mechanical fasteners at fixed points, adhesives at certain points other than where a heat transfer material is located, or other such mechanisms for maintaining a mechanical (e.g., physical) connection between the mmW module 310 and the heatsink 330 to facilitate heat transfer from the mmW module 310 to the heatsink 330, and associated heat dispersion via the heatsink 330.

As described herein, the apparatus 300 includes one or more mmW antennas in the mmW module 310, and also includes a non-mmW antenna as part of the heatsink 330. The apparatus 300 includes a non-mmW antenna as part of the design structure of the heatsink 330, and the non-mmW antenna may be configured to dissipate heat or may otherwise be designed into thermal characteristics for the heatsink 330. Such a design can function with a metallic or conductive portion of the structure for the heatsink 330 integrated directly as a non-mmW antenna without sacrificing mmW or non-mmW antenna performance, and while preserving heat dispersion characteristics. By fine tuning the structure of the heatsink 330 as part of design of the apparatus 300, the non-mmW antenna aspect of the heatsink 330 allows flexibility to provide antenna performance or additional radio access technology (RAT) functionality for a given mmW module based on the particular design of the heatsink 330 and design preferences of a device including the apparatus 300. For example, parameters (width, length, thickness, shape, material, grounding points, distance from the mmW module 310, etc.) of the non-mmW antenna may be adjusted based on frequency at which communications may be transmitted and/or received, based on desired antenna efficiency or radiated power, based electrical or conductive components which will be positioned near the apparatus 300 when included in a device, etc. As illustrated in FIG. 3A and FIG. 3B, the heatsink 330 includes metal structures that can be configured for particular RAT and frequency operation, as well as providing physical structures for connections between the mmW module 310 and the heatsink 330 (e.g., using adhesive 320), as well as the illustrated structures for physically fastening apparatus 300 to other elements of a device (e.g., via screw holes for fastening to frame structures of a mobile device, a laptop, a tablet, CPE, or any other such devices including mmW and non-mmW wireless communication support). In some embodiments, screws or other connectors which fasten the heatsink 330 to a frame or chassis of a device (e.g., via the holes illustrated in FIGS. 3A and 3B) couple the heatsink 330 to system ground (e.g., near each end).

In various aspects, the apparatus 300 can be configured with additional control or communication circuitry configured to provide data signals compatible with a particular RAT. As described herein, "data signals" include signals transmitted and received as part of a communication system, ranging codes in global positioning systems, radar signals (e.g., transmissions or reflections including data about local objects), or other such codes or signals including information that can be received by an antenna and processed by control circuitry coupled to the antenna. The non-mmW antenna can receive an amplified signal via a signal feed that is particularly configured and amplified to a given gain level for the non-mmW antenna and an associated RAT. Such a RAT may, for example, have particular power transmission limits, with the data signal amplified to within a threshold level of the power transmission limits in order to provide for acceptable transmission distances while avoiding excessive electromagnetic exposure to sensitive objects or individuals near the apparatus 300. The heatsink in such aspects is not simply reflecting ambient signals, but is configured as a non-mmW device configured to receive signals in a particular RAT configuration and/or transmit signals in the RAT configuration, within power limits defined by the RAT standard operation. For example, the non-mmW antenna of the non-mmW device may be configured to resonate or radiate at a certain frequency so as to provide a desired gain to communication signals, operate with a desired EIRP, or perform according to another metric that is determined to be effective for wireless communication. In some embodiments, the non-mmW antenna is an example of the antenna array 248 in FIG. 2A. Signals are directed to or from the non-mmW antenna using a signal feed element coupled to the heatsink. Similarly, mmW module 310 can be coupled to circuitry that provides a data signal at mmW signal nodes (e.g., ports). Signals passed between the mmW antenna(s) and a mmW signal node (e.g., a signal port or a node or position in the signal path) are processed in the mmW module (e.g., subject to beamforming, phase shifting, power amplification, etc.) to provide defined communication performance, for example as described above in FIGS. 2B and 2C.

Figure 4A:
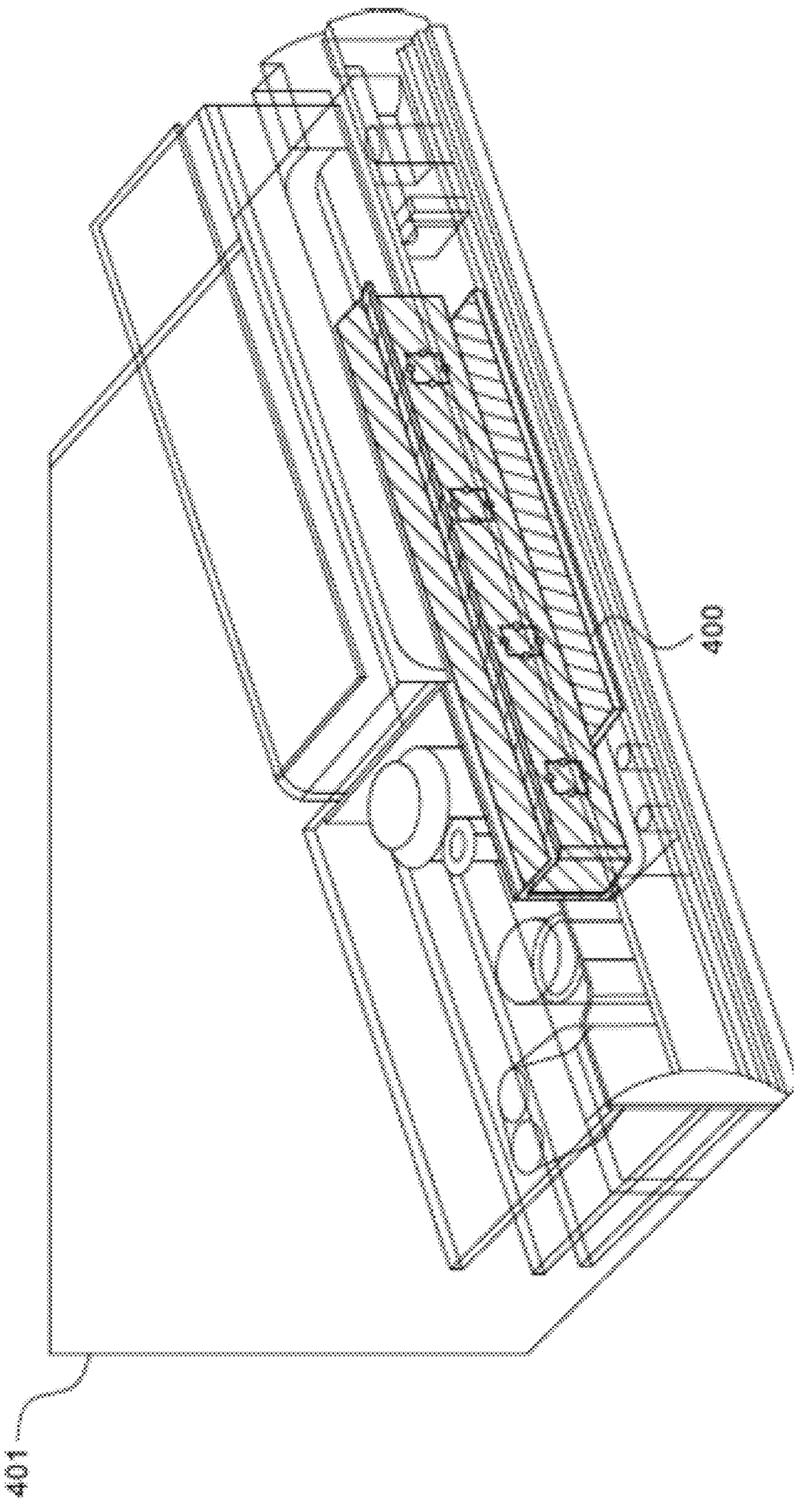
FIG. 4A is a diagram illustrating aspects of a device including a heatsink and a mmW module for integration of mmW and non-mmW antennas in accordance with aspects described herein.

FIG. 4A is a diagram illustrating aspects of a device 401 including an apparatus 400. Various aspects and portions of the apparatus 400 are illustrated in additional detail in FIGS. 4B-4E, and may not be individually visible or identified in the illustration of FIG. 4A.

The apparatus 400 includes a heatsink 430 and a mmW module 410 for integration of mmW and non-mmW antennas in accordance with aspects described herein. While device 401 particularly illustrates an example of a mobile device, in other aspects, the apparatus 400 can be integrated and/or customized for any type of device including wireless communication support for mmW and non-mmW frequencies as described above. The apparatus 400 particularly includes heatsink 430 configured as a non-mmW antenna having a feed point 432, as well as mmW module 410 and a heat dispersion adhesive 420. In one implementation, the mmW module 410 is approximately 2 millimeters (mm) wide, 3.5 mm tall, and 24 mm long. In some such implementations, the heatsink 430 can include mechanical attachments to the mmW module 410 that extend along any surface of the dimensions of the mmW module 410. In some implementations, the heatsink 430 can extend any distance past the dimensions of the mmW module to provide structure for the non-mmW antenna that makes up part of the heatsink and radiates thermal energy to a heat dissipation environment (e.g., air, a thermal dissipation liquid, etc.). In some examples, the adhesive 320 covers a side of the mmW module 410 that is approximately 17.5 mm of the 24 mm length of the mmW module on the side that is approximately 3.5 mm. In some examples, the adhesive 320 can further extend past the side of the mmW module 410 by approximately 2 mm, and extend across a portion of the heatsink 430 attached to frame metal 450 without touching the mmW module 410. As illustrated in FIG. 4D, this results in a gap between the mmW module 410 and a portion of the heatsink 430 that mechanically (e.g., physically) directly attaches to 450, with the adhesive 420 attached to the heatsink 430 on one end and across the gap, where the adhesive 420 is not attached to the mmW module 410 across the gap (e.g., as shown in the lower right side of the apparatus 400 in FIG. 4D just above the frame metal 450 and to the right of the non-mmW feed point 432. In other examples, other such dimensions can be used, with heatsink dimensions configured to both support a given non-mmW antenna frequency and to support a given level of heat transfer from the mmW module 410 to a dispersion environment via the heatsink 430.

Figure 4B:
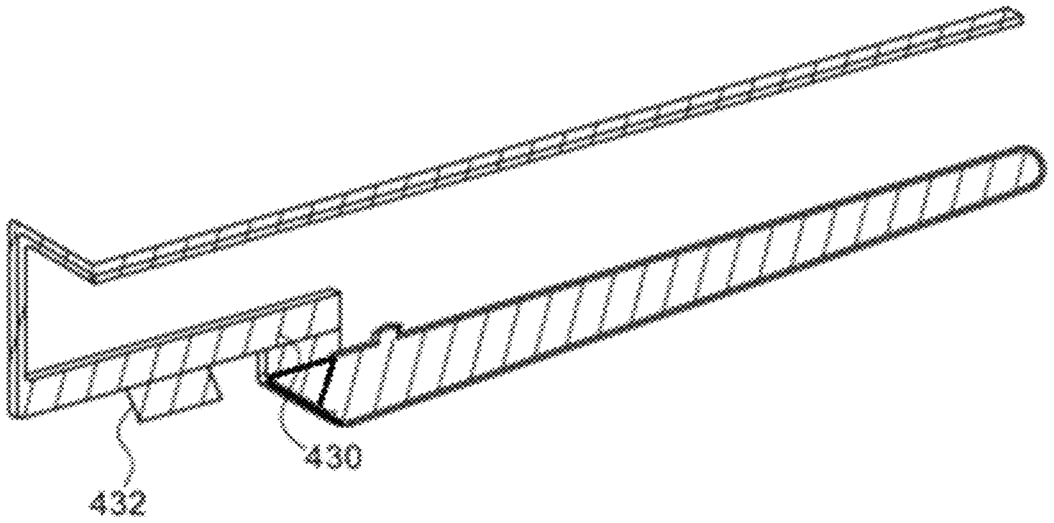
FIG. 4B is a diagram illustrating an implementation of a heatsink in accordance with aspects described herein.

FIG. 4B is a diagram illustrating an implementation of the heatsink 430 as a non-mmW antenna in accordance with aspects described herein. As illustrated, the heatsink 430 includes a non-mmW feed point 432 for receiving non-mmW signals to be transmitted using the integrated heatsink 430 or a portion thereof as a non-mmW antenna and/or for receiving signals wirelessly received by the non-mmW antenna of the heatsink 430. For example, the feed point 432 may be coupled to the PA 244 or switch 246 illustrated in FIG. 2A, for example using a cable or conductive trace or line, etc. Additional details of the non-mmW antenna operation and configuration to avoid interference with mmW communications using the mmW module are discussed below with respect to FIG. 4E.

The heatsink 430 is configured with conductive elements configured to radiate signals at non-mmW frequencies. In some aspects, the heatsink is designed to radiate at frequencies at or around 1.6 GHz to receive global positioning system (GPS) signals (e.g., 1.575 GHz). In other aspects, the antenna can be designed to receive other non-mmW GPS signals (e.g., 1.2276 GHz, L2; 1.176 GHz, L5; etc.). In further aspects, the antenna can be designed to receive or transmit signals below 7 GHz, in communication bands between 1.5 GHz and 4.75 GHz, 800 megahertz (MHz) to 1.2 GHz, 600 MHz to 700 MHz (e.g., LTE low bands), 6 GHz to 7 GHz (e.g., WiFi 6E bands), or at other such non-mmW frequencies or frequency ranges, for example to communicate according to a 5G, 4G, 3G, 2G, WiFi, Bluetooth, etc. standard or according to another communication protocol or strategy.

In some examples, the heatsink 430 is constructed using a single, integral piece of a material. For example, the heatsink 430 illustrated in FIGS. 4A-4E may be constructed of a single piece of metal folded into the illustrated shape. In other examples, the heatsink 430 is composed of several pieces which are physically (e.g., permanently or semi-permanently) connected together. For example, the heatsink 430 may be constructed by fastening several different conductive pieces and/or materials together.

Figure 4C:
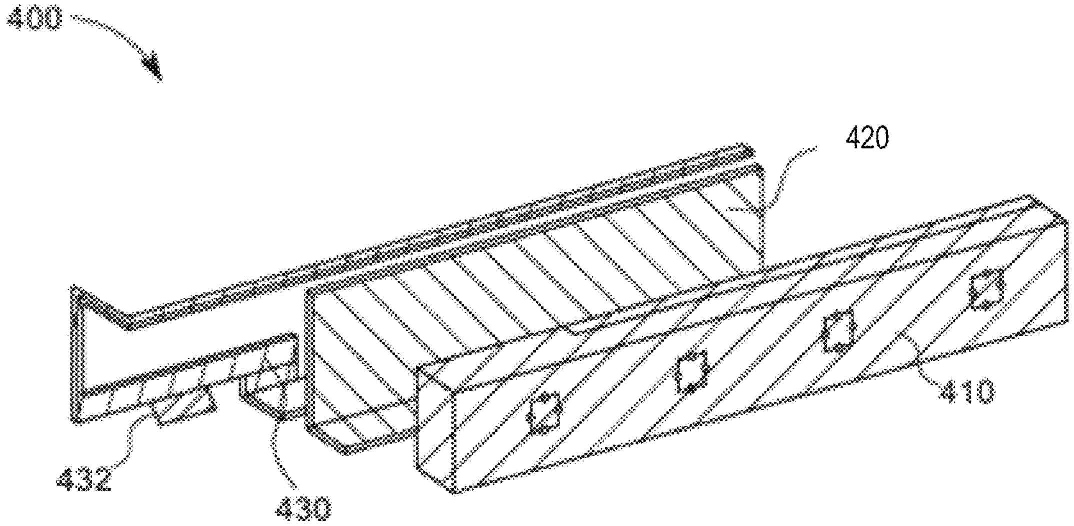
FIG. 4C is a diagram illustrating aspects of a heatsink and a mmW module for integration of mmW and non-mmW antennas in accordance with aspects described herein.
Figure 4D:
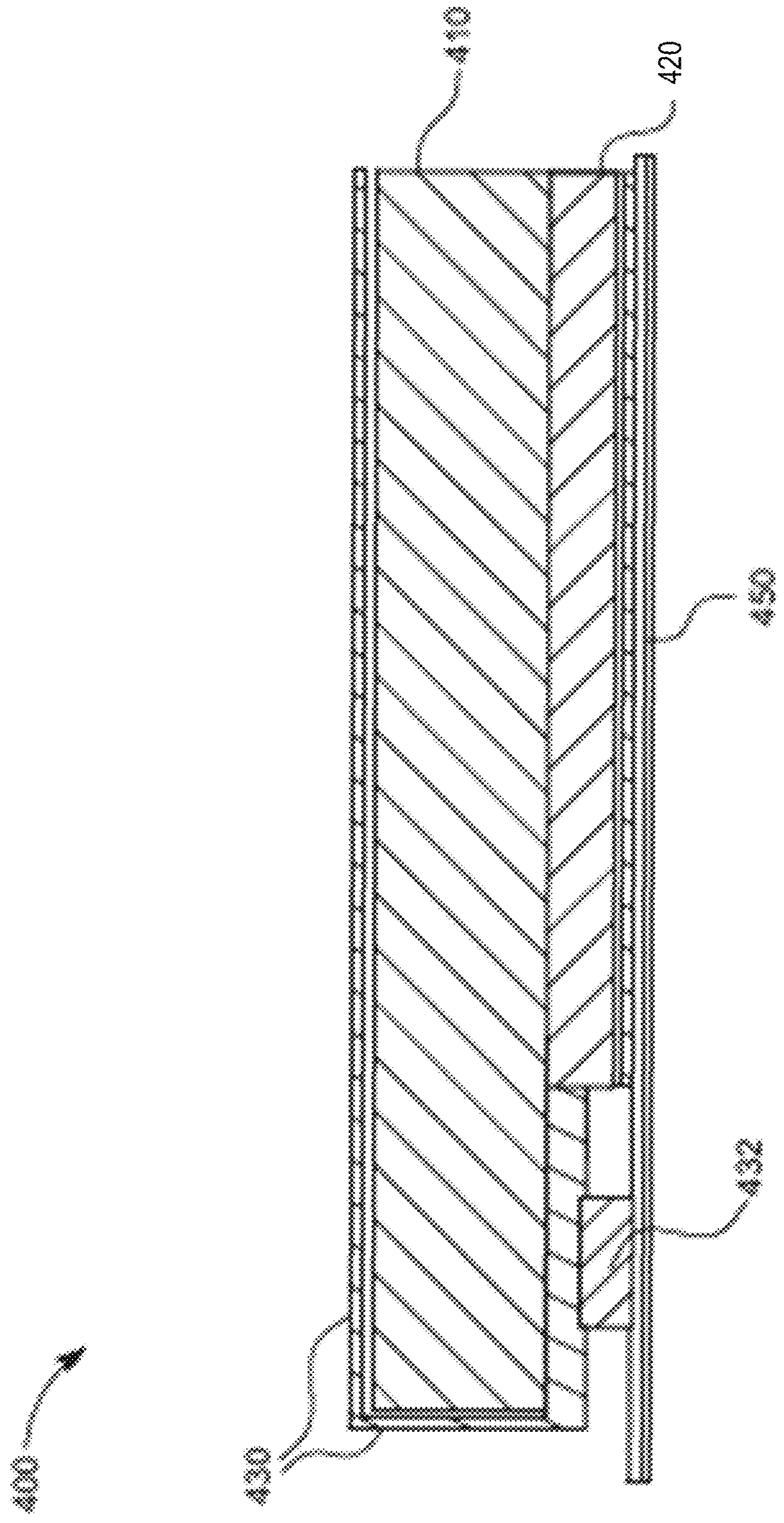
FIG. 4D is a diagram illustrating aspects of a heatsink and a mmW module for integration of mmW and non-mmW antennas in accordance with aspects described herein.
Figure 4E:
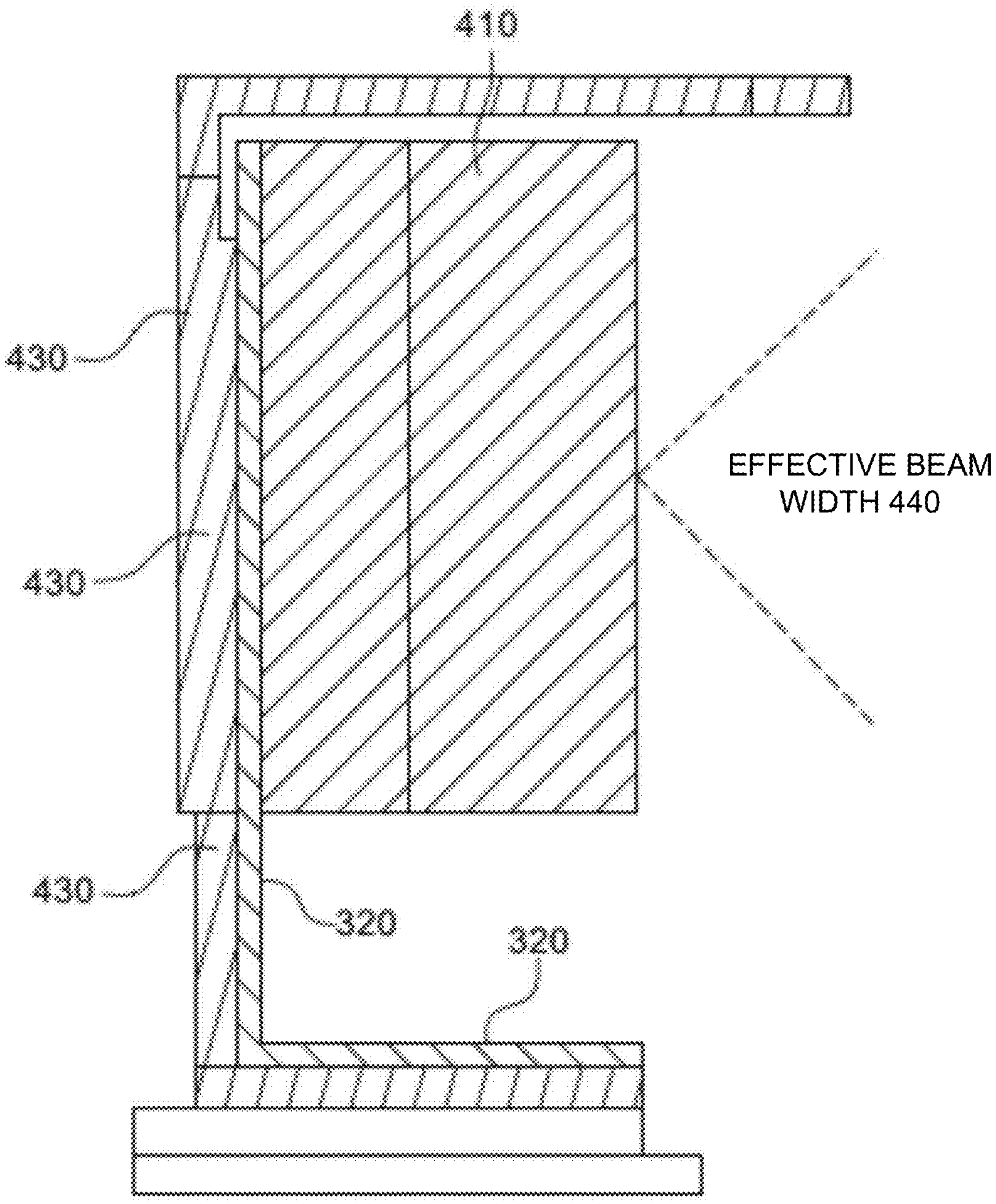
FIG. 4E is a diagram illustrating aspects of a heatsink and a mmW module for integration of mmW and non-mmW antennas in accordance with aspects described herein.

FIG. 4C is a diagram illustrating aspects of the apparatus 400 including the heatsink 430 and the mmW module 410 for integration of mmW and non-mmW antennas in accordance with aspects described herein. FIG. 4D is a diagram illustrating aspects of the apparatus 400 including the heatsink 430 and the mmW module 410 for integration of mmW and non-mmW antennas in accordance with aspects described herein. FIG. 4E is a diagram illustrating aspects of the apparatus 400 including the heatsink 430 and the mmW module 410 for integration of mmW and non-mmW antennas along with an effective beam width 440 for mmW communications in accordance with aspects described herein. FIG. 4C shows an exploded view of the apparatus 400 including non-mmW antenna and heatsink 430, heat dispersion adhesive 420, and mmW module 410. FIG. 4D shows a front view of apparatus 400, and FIG. 4E shows an end view of apparatus 400. While apparatus 400 of FIGS. 4A-E is one specific example of an apparatus with a heatsink for integrating mmW and non-mmW antennas, other implementations will be apparent based on operational characteristics and heat dispersion design preferences.

As shown, the heat dispersion adhesive 420 need not be limited to the direct contact areas where heatsink 430 would directly contact the mmW module 410 frame (e.g., packaging or other such mmW frame or structure). By physically coupling the heat dispersion adhesive 420 to additional portions of the heatsink 430, the thermal dissipation of energy transferred from mmW module 410 to heatsink 430 via heat dispersion adhesive 420 can be increased. While additional surface area contact between mmW module 410 and heat dispersion adhesive 420 allows a greater transfer of thermal energy from the mmW module, in certain implementations, a limiting factor in thermal performance is the ability for heatsink 430 to dissipate the thermal energy, and so increased contact between the heat dispersion adhesive 420 to the heatsink 430 may increase the heat dissipation performance of the apparatus 400 without the heat dispersion adhesive 420 being connected to all available surfaces of the mmW module 410. In other implementations, transfer of thermal energy from the mmW module 410 to the heatsink 430 may be a limiting factor in thermal performance, and so the surface of the mmW module 410 physically coupled to the heat dispersion adhesive 420 is maximized to limit the thermal performance bottleneck. As described above, in other implementations, other thermal transfer configurations, including configurations with no heat dispersion adhesive, may be used based on the specific thermal performance characteristics of a corresponding mmW module. In addition to the thermal performance of the heat dispersion adhesive 420 along with the heat transfer characteristics of the heatsink 430 and the mmW module 410 (e.g., the frame or packaging of the mmW module 410), a thermal dissipation medium around the heatsink 430 can also impact design of the apparatus 400. If, for example, air is the thermal dissipation medium, the presence of venting or a fan will impact the expected thermal dissipation performance of the heatsink 430. Similarly, if the apparatus 400 is structured within an environment with a specially designed heat transfer fluid or liquid other than air (e.g., having greater thermal dissipation characteristics than air), the heatsink 430 can be structured differently.

Additionally, a device including the apparatus 400 can have frame metal 450 which can be used to provide a reference voltage (e.g., ground) connection to portions of the heatsink 430. Additionally, in some aspects, the frame including the mid-frame metal can further include metal or other thermally conductive surfaces that can further serve as a heat transfer medium to assist heatsink 430 in conducting thermal energy away from the mmW module 410. In some implementations, the mid-frame metal can be part of the electrical design of the antenna aspects of the heatsink 430. In other aspects, the frame metal 450 can be electrically isolated from the heatsink 430, or can be structured of other material to provide a physical structure and placement for the apparatus 400 without impacting the electrical or wireless performance of the apparatus 400.

In some implementations, the heatsink 430 is configured for physical (e.g., mechanical) connections with only one side of a mmW module. In other implementations, the surface area connection is maximized with physical connections between two or more sides of the mmW module where conductors and/or reference voltage (e.g., ground) elements of a non-mmW antenna wrap around edges of a mmW module frame to provide physical coupling and associated heat transfer from multiple sides of mmW module 410.

In some implementations, the heatsink connection can be structured as part of a particular antenna design. For example, a monopole or dipole antenna can be configured with conductors on a single side of a mmW module or with conductors on a single side of a mmW module and a reference (e.g., ground) plane on a different side of the mmW module. In some implementations, an L-antenna or an inverted-F can be configured with portions of the L or F shape of antenna conductors wrapped around the mmW module to have conductors on multiple sides of the mmW module. In such implementations, the conductor placement, the feed point positioning, and placement of any ground plane around a frame or package shape of the mmW module can be particularly designed based on the desired antenna characteristics of the non-mmW antenna. For example, in some implementations the heatsink 430 illustrated in FIGS. 4A-4E is configured as an inverted-F antenna, with the portion of the heatsink 430 that is coupled to the frame metal 450 being a ground coupling. The position of the feed point 432, the total electrical length of the heatsink starting from the feed point 432, a distance between the feed point 432 and the grounded portion, etc. may all be adjust so as to implement an antenna having a desired radiation frequency, a desired impedance, etc. Similarly, in loop antenna implementations for the non-mmW antenna/heatsink, the antenna can wrap completely around the mmW module frame, or wrap around the outside of the frame with a small break depending on the particular loop antenna design. In other aspects, antennas with any such shapes that also allow physical connections and associated thermal transfer between a mmW module and a heatsink/non-mmW antenna can be used. Further, while examples having one feed point 432 are discussed above, additional feed points may be used. For example, two feedpoints may be used to configure the non-mmW antenna as a dipole. As another example, the heatsink may be split into two portions which are electrically disconnected and a feedpoint may be connected to each portion such that two non-mmW antennas may be formed from the heatsink. In some examples, more than two antennas are formed by the heatsink. Additional examples are described below with respect to FIGS. 5, 6, and 7.

In some aspects, the thermally conductive adhesive 420 may have electrically conductive or electrically resistive properties, and positioning of the heat dispersion adhesive or different heat dispersion adhesives (e.g., with different electrical characteristics) can also be positioned to impact antenna operation.

In addition to the thermal performance of the heatsink 430, the non-mmW communication performance of heatsink 430 and the mmW communication performance of mmW module 410 are important characteristics of the apparatus 400. As illustrated, mmW module 410 has an effective beam width 440 (e.g., an area for the mmW signal focus, where the area outside the effective beam width 440 has a signal power below a threshold value or below a threshold ratio from a peak value at a center of the effective beam width). In some aspects, the effective beam width can be a range within which the beam can be steered (e.g., beam steering can achieve acceptable power transmission or other acceptable performance characteristics within the define effective beam width 440). Such a beam width can be based on the antenna array (e.g., one or more antenna elements of the mmW module 410) and/or phase shift circuitry of the mmW module 410, as well as interference from the non-mmW antenna characteristics of heatsink 430. In the implementation illustrated in FIG. 4E, the effective beam width 440 allows the mmW module 410 to radiate and/or receive signals in the gap area where no conductor of the non-mmW antenna (e.g., the heatsink. 430) is present. The illustrated structure allows the mmW signals and the non-mmW signals to communicate independently without regard for interference between the mmW and non-mmW antenna signals.

In such embodiments, the particular non-mmW antenna can then be configured to avoid interference with the effective beam width 440 for the mmW module 410. In the example of the apparatus 400 of FIGS. 4A-E, the particular non-mmW antenna shape of the heatsink 430 allows transmission of non-mmW signals without interference with mmW signals in the effective beam width (e.g., the three-dimensional beam pattern) from mmW module 410. In other configurations of non-mmW antennas, including monopole, dipole, L-antenna, inverted-F, loop antenna, and other such configurations, physical positioning of the non-mmW antenna (e.g., conductor elements and reference or ground elements of the heatsink 430) can be implemented to avoid interference between mmW signals and non-mmW signals while providing for operation of the non-mmW antenna as a heatsink to dissipate thermal energy from the mmW module 410.

In some examples, heat dissipated from a portion of the heatsink 430 which primarily resonates or radiates when communicating at a configured frequency is relatively small, for example minimal or approximately zero. Thus, while a portion of the heatsink 430 may be configured as a non-mmW antenna, it is not required that non-mmW portion significantly contribute to the dissipation of heat. Similarly, portions of the heatsink 430 which primarily or significantly dissipate heat may not effectively radiate signals in a frequency at which a device incorporating the heatsink 430 is configured to operate. In some examples, a heat dissipation portion of the heatsink 430 does not effectively radiate such signals, but forms a portion of the antenna. For example, in the configuration illustrated in FIGS. 4A-4E, the portion of the heatsink 430 that is coupled to the frame metal 450 may dissipate a significant amount or proportion of heat and may be configured to provide a ground coupling for an invented-F non-mmW antenna configuration, but may not effectively radiate signals in a desired communication frequency. In other embodiments, heat dissipation and communication signal radiation portions may partially, mostly, or entirely overlap or be the same.

Figure 5A:
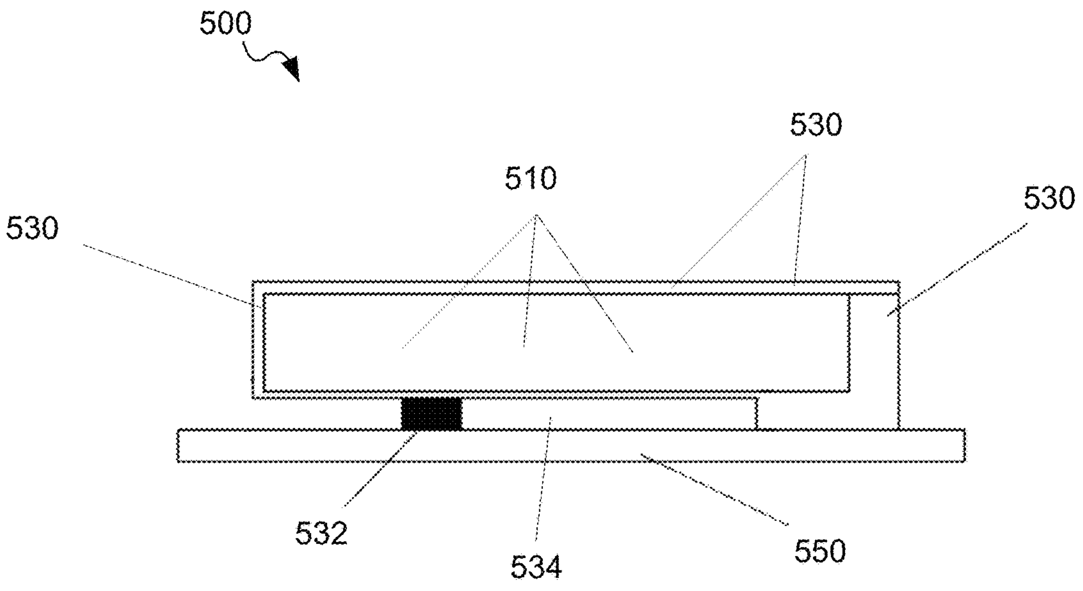
FIG. 5A is a diagram illustrating aspects of a heatsink and a mmW module for integration of mmW and non-mmW antennas in accordance with aspects described herein.
Figure 5B:
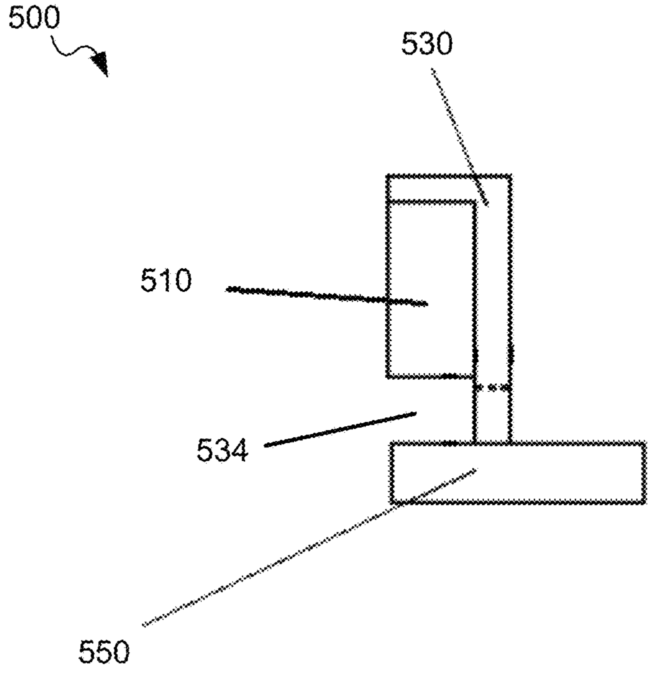
FIG. 5B is a diagram illustrating aspects of a heatsink and a mmW module for integration of mmW and non-mmW antennas in accordance with aspects described herein.
Figure 5C:
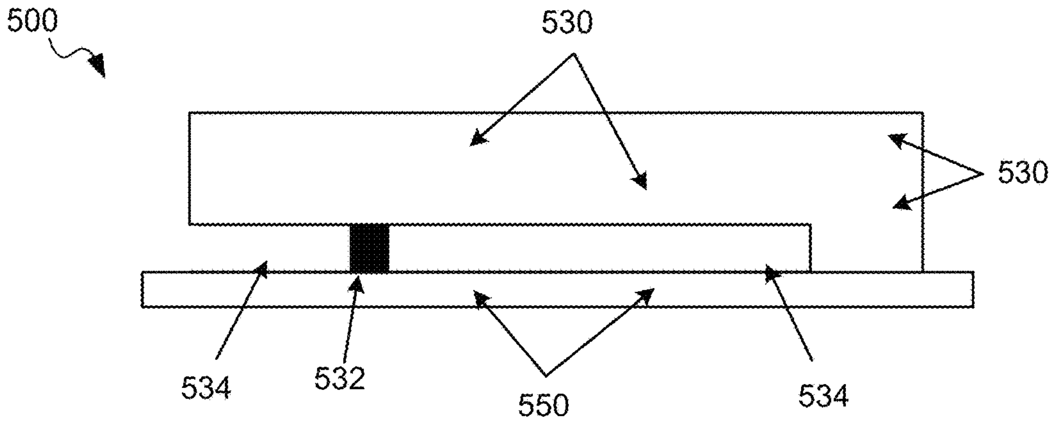
FIG. 5C is a diagram illustrating aspects of a heatsink and a mmW module for integration of mmW and non-mmW antennas in accordance with aspects described herein.

FIGS. 5A, 5B, and 5C are diagrams illustrating aspects of an apparatus 500 including a heatsink 530 (e.g., comprising a non-mmW antenna) and a mmW module 510 for integration of mmW and non-mmW antennas in accordance with aspects described herein. The heatsink 530 of FIGS. 5A-C comprises a quarter wavelength slot antenna created by configuring the heatsink to form a slot structure 534 between the heatsink and the frame metal 550. The non-mmW feed 532 is used in a signal path to provide non-mmW data signals (e.g., communication data, GPS data, etc.) to and/or from the heatsink 530 comprising the non-mmW antenna. The frame metal 550 provides attachment and mechanical structure to fix the apparatus 500 within a larger device (e.g., a mobile phone, a laptop, etc.), and can also function to provide a reference plane (e.g., a ground).

FIG. 5A shows a front view of apparatus 500 looking across slot structure 534, with mmW module 510 between the point of view and the heatsink 530. FIG. 5B shows an end view of apparatus 500 looking at an end view of the long slot structure 534. In FIG. 5B, the feed 532 is blocked by the portion of heatsink 530 connected directly to the frame metal 550 (e.g., the heatsink 530 is between the feed 532 and the point of view of FIG. 5B). FIG. 5C shows the same point of view as FIG. 5A, but without the mmW module 510. None of FIGS. 5A-C show an adhesive. In some examples, the area of heatsink 530 covered by mmW module 510 in FIG. 5A would have an adhesive used to facilitate conduction of thermal energy from the mmW module 510 to the heatsink 530 for dissipation of the heat. In other aspects, such a thermally conductive adhesive can cover additional area of the heatsink 530, so that in certain portions of the heatsink, the adhesive is coupled on one side to the heatsink 530, and the other side of the adhesive layer is not coupled to the mmW module, in order to assist with the transfer of thermal energy from the mmW module 510 to the heatsink 530. In some such examples, the adhesive is roughly "L" shaped so as to create a gap between the mmW module 510 and a portion of the heatsink 530 where the adhesive is exposed, similar in some respects to the configuration described with respect to FIG. 4D. In other examples, other configurations can be used.

The heatsink 530 is illustrated as having a wide portion that contacts (directly or indirectly) all of a backside of the mmW module 510. In contrast, the heatsink 430 has a broad base for attachment to the frame 450 and a narrow arm extending therefrom which wraps around at least one side of the mmW module 410 and follows an edge of the mmW module 410 without contacting the mmW module 410. In some examples, spacing the narrow arm or any wrap-around portions of the heatsink a threshold distance from the mmW module 410 reduces the likelihood of degrading performance of any of the mmW antennas and the non-mmW antenna. As illustrated in FIG. 4, the mmW module 410 may be coupled to the heatsink at only a small segment other than the broad base. The width and/or length of the heatsink may be designed to meet one or more intended uses. For example, wrapping portions of the heatsink around the mmW module may allow for an increased length of the non-mmW antenna in some configurations. In some such configurations, the non-mmW antenna may form a meandering antenna (and may form part of a MIFA, for example). Further, while the heatsinks 430, 530, are illustrated in FIGS. 4 and 5 as being in close proximity to an attached mmW module or roughly following a shape of the mmW module, a portion of the heatsink may extend significantly beyond or away from the mmW module. This may allow for greater heat dissipation and/or for increased non-mmW antenna size in some examples.

As illustrated by the apparatus 500, the heatsink 530 can include portions of the heatsink that form a non-mmW antenna (e.g., a slot antenna using the slot structure 534). In other implementations, rather than forming the slot structure 534 between the heatsink 530 and the frame metal 550, cutouts in the heatsink 530 can be used to form a slot structure, so that the slot structure can be formed entirely of the heatsink metal. In other examples, any other such structure can be used in accordance with aspects described herein to provide a heatsink for a mmW module, where the heatsink comprises a non-mmW antenna.

Figure 6:
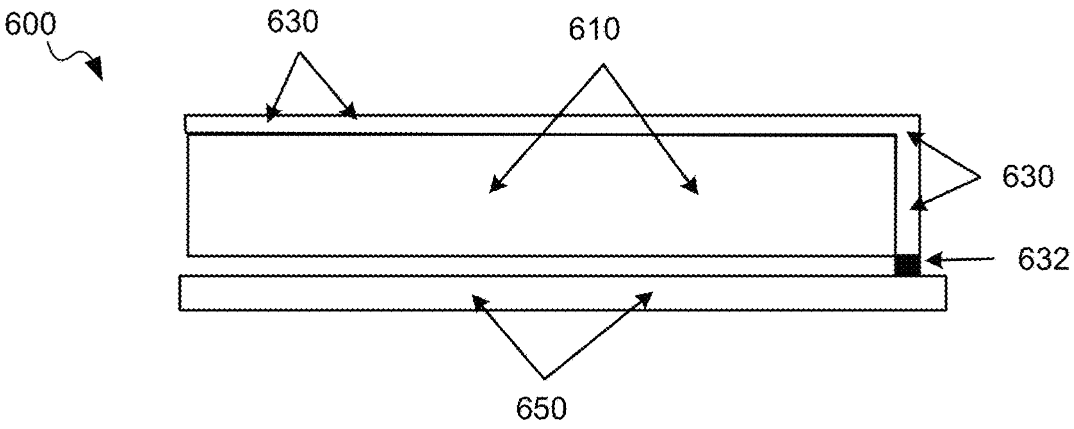
FIG. 6 is a diagram illustrating aspects of a heatsink and a mmW module for integration of mmW and non-mmW antennas in accordance with aspects described herein.

FIG. 6 is a diagram illustrating aspects of an apparatus 600 comprising a heatsink 630 (e.g., where the heatsink 630 comprises a non-mmW antenna) and a mmW module 610 for integration of mmW and non-mmW antennas in accordance with aspects described herein. While heatsink 530 of FIGS. 5A-C comprises a quarter wavelength slot antenna, the heatsink 630 of FIG. 6 comprises a quarter wavelength monopole antenna. The monopole has a conductive element that extends from the feed 632 near the frame metal 650 up the height of the mmW module 610, and across the length of the mmW module 610. In various implementations a conductive element of the monopole antenna can be different physical and/or electrical lengths for particular application support. In one implementation, the monopole antenna of apparatus 600 is approximately 24.1 mm. In some implementations, the heatsink and the associated conductive element can extend entirely across a length of the associated mmW module, can be shorter than a length of the mmW module, can extend past an edge of the mmW module (e.g., so that the heatsink and the conductive element of the antenna that is integrated with the heatsink is not adjacent to or touching the mmW module directly or via a thermally conductive adhesive). In other examples, other similar antennas with other conductor layouts (e.g. other than a monopole layout) can be used.

Figure 7:
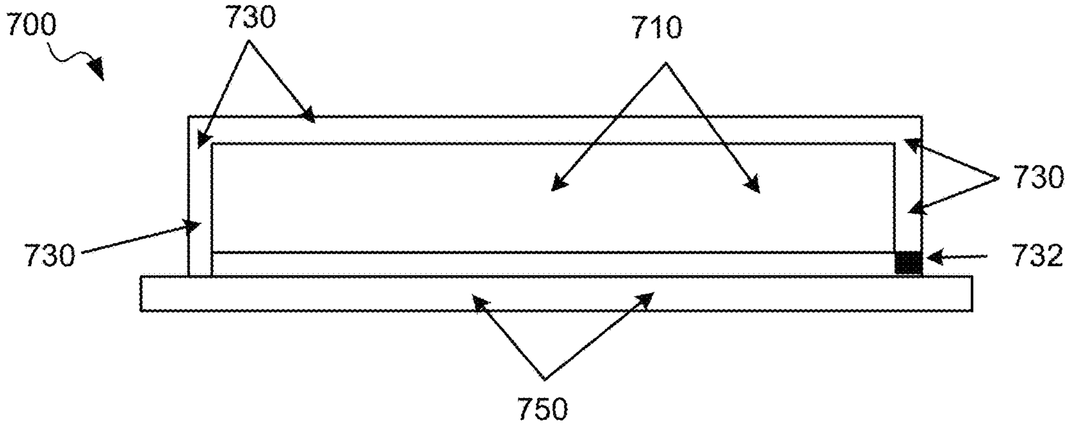
FIG. 7 is a diagram illustrating aspects of a heatsink and a mmW module for integration of mmW and non-mmW antennas in accordance with aspects described herein.

FIG. 7 is a diagram illustrating aspects of an apparatus 700 including a heatsink 730 (e.g., where the heatsink 730 comprises a non-mmW antenna) and a mmW module 710 for integration of mmW and non-mmW antennas in accordance with aspects described herein. In FIG. 7, the feed 732 is used as part of a data signal route between the non-mmW antenna portions of the heatsink 730 to circuitry of a device including the apparatus 700. As described above, this can be data as part of a communication system, part of a GPS system, or part of any other such wireless communication or wireless sensing system. The apparatus 700 of FIG. 7 includes the heatsink 730 comprising a half wavelength loop antenna. As illustrated, the heatsink structure has a non-mmW feed 732 near the heatsink 730 and the frame metal 750. The heatsink extends from the feed 732 up a side of the mmW module 710, and across a top length of the mmW module 710, then down the opposite side of the mmW module 710 away from the feed 732. As above, the frame metal 750 can be used as part of the structure of the apparatus 700 both to support the antenna structure of the heatsink 730, and to physically fix the position of the apparatus 700 in a device and the elements of the apparatus 700 in relative positions. The space below the mmW module 710 which is between the mmW module 710 and the frame metal 750 can be an air gap and can, in some implementations, include an air gap and/or a space for thermally conductive adhesive.

Figure 8A:
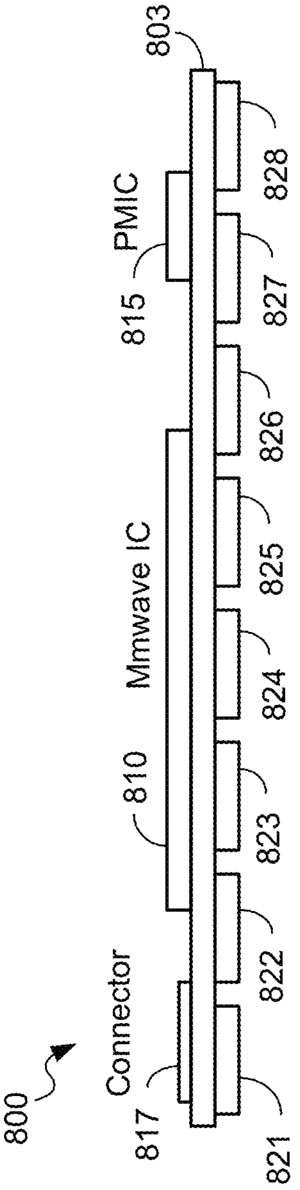
FIGS. 8A, 8B, 8C and 8D are block diagrams illustrating a mmW module in accordance with aspects of the disclosure.
Figure 8B:
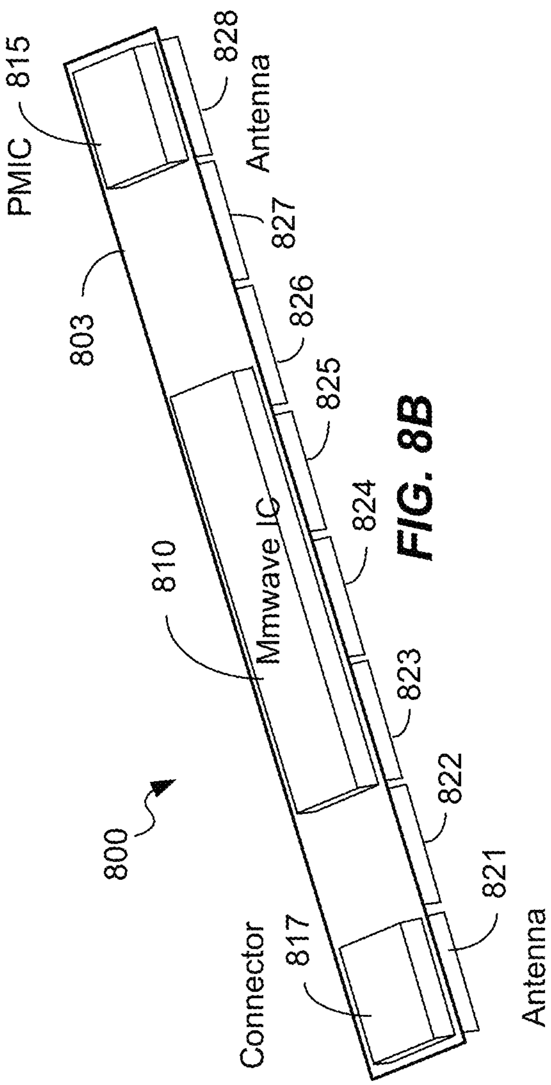
Figure 8C:
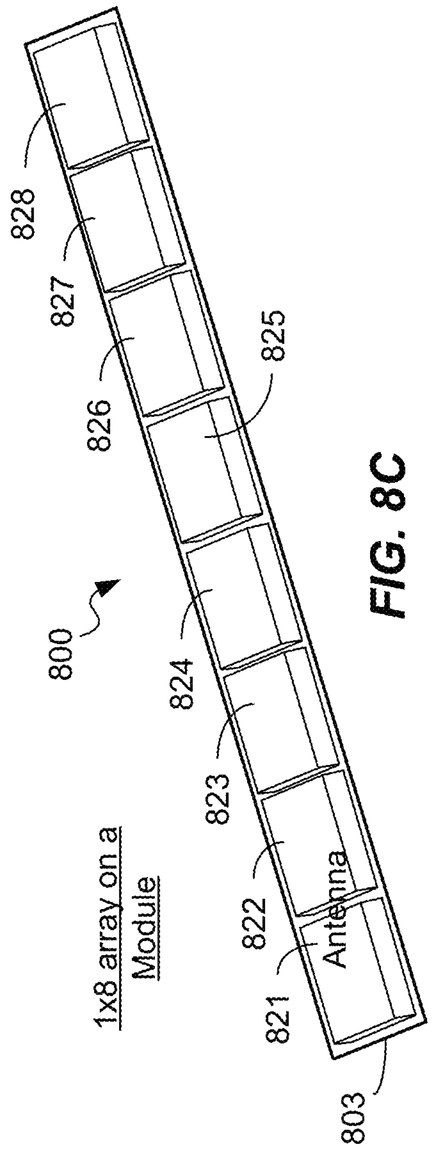

FIGS. 8A, 8B and 8C are block diagrams collectively illustrating some aspects of a millimeter wave (mmW) module in accordance with some aspects of the disclosure. FIG. 8A shows a side view of a millimeter wave (mmW) module 800. The mmW module 800 may be an example of the mmW modules 310 and 410 shown in FIGS. 3A-B and 4A-E. In some aspects, the mmW module 800 may comprise a 1×8 phased array fabricated on a substrate 803. In some aspects, the mmW module 800 may comprise a mmWIC 810, a power management IC (PMIC) 815, a connector 817 and a plurality of antennas 821, 822, 823, 824, 825, 826, 827 and 828 fabricated on a substrate 803. Fewer or additional antennas than illustrated may be implemented. Further, while linear arrays are illustrated in FIGS. 8, a two dimensional array may be implemented.

FIG. 8B is a top perspective view of the mmW module 800 showing the mmWIC 810, a PMIC 815, a connector 817 and a plurality of antennas 821, 822, 823, 824, 825, 826, 827 and 828 on the substrate 803. While the antennas 821-828 are shown for ease of explanation, in some configurations the antennas 821-828 may not be visible in such view, for example because they are integral and/or flush with the substrate 803. In some examples, the connector 817 is used to couple the upconverter 240, and/or the downconverter 260, and/or the functions 278, 291 (which all may be implemented external to the module 800) to the upconverter 275 and/or downconverter 285, or to the mixer 276 and/or the mixer 286 (which all may be implemented in the mmWIC 810). The PMIC 815 may be configured to supply system voltages to such components in the mmWIC 810 or other circuitry in the mmWIC 810. FIG. 8C is a bottom perspective view of the mmW module 800 showing the antennas 821, 822, 823, 824, 825, 826, 827 and 828 on the substrate 803.

Figure 8D:
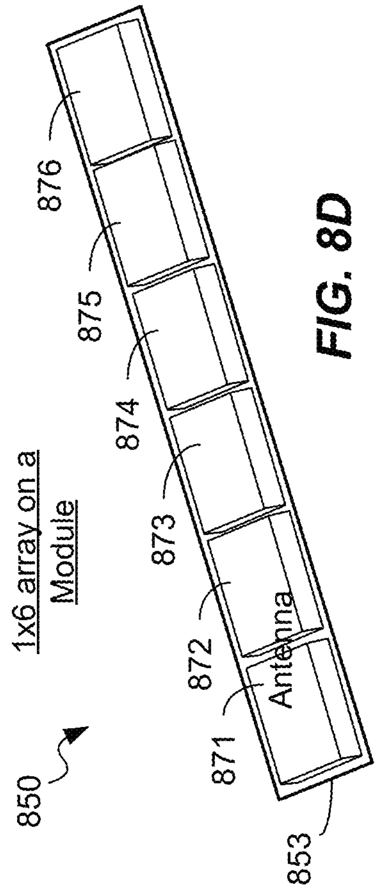

FIG. 8D shows an alternative embodiment of a millimeter wave (mmW) module 850. The mmW module 850 may be similar to the mmW module 800 shown in FIG. 8A, but is arranged as a 1×6 array. In some aspects, the mmW module 850 may comprise a 1×6 phased array fabricated on a substrate 853. In some aspects, the mmW module 850 may comprise a plurality of antennas 871, 872, 873, 874, 875 and 876 fabricated on the substrate 853.

In some aspects, every phase array element associated with each antenna 871, 872, 873, 874, 875 and 876 on the mmW module 850 are structured within a thermally conductive frame or with additional thermally conductive elements to convect thermal energy to an exterior of the mmW module 850, and then to a heatsink. Such a frame may be metallic or of any other such material suitable for providing thermal transfer of heat energy from mmW module 850 while avoiding interference with mmW signals from each of antennas 871, 872, 873, 874, 875, and 876 (e.g., in an associated effective beam width for the antenna array). Such a frame or package structure can further be particularly configured based on an expected non-mmW antenna configuration and associated physical interfaces for thermal conduction of heat energy to allow the non-mmW to act as a heat sink to dissipate thermal energy from the mmW module while allowing the mmW and non-mmW antennas to operate without mutual interference. Such interference refers to signals and antenna elements disrupting signals to or from another antenna. To avoid mutual interference, the non-mmW antenna of the heatsink is configured to avoid or limit disruption of signals sent to or from the mmW module, and the mmW module is similarly configured to avoid or limit disruption (e.g., interference) with signals sent to or from the non-mmW antenna of the heatsink. As described, such an apparatus combining the elements of a mmW module and a heatsink operating as a non-mmW antenna can be fabricated with reduced size given the lack of separate non-mmW antennas and mmW module heatsink(s). A wide variety of thermal transfer characteristics and non-mmW communication performance can be implemented with modifications to the mmW packaging and heatsink designs.

Figure 9:
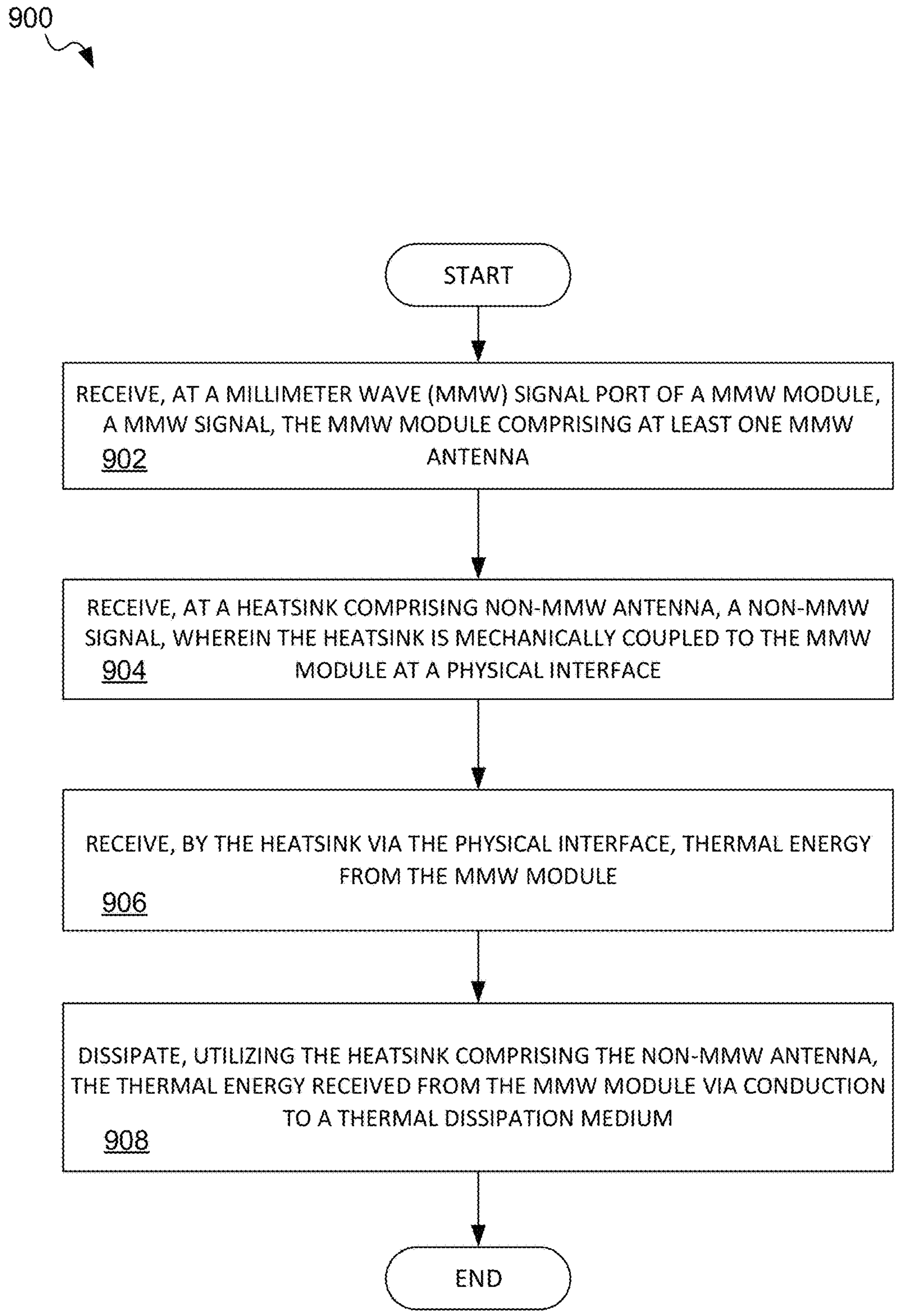
FIG. 9 is a flow diagram describing an example of the operation of a method for operation of a device including a mmW module and an integrated heatsink with a non-mmW antenna in accordance with some aspects.

FIG. 9 is a flow diagram describing an example of the operation of a method for reflection type phase shifting in accordance with some aspects. The blocks in the method 900 can be performed in or out of the order shown, and in some embodiments, can be performed at least in part in parallel.

The method 900 includes block 902 which involves receiving, at a millimeter wave (mmW) signal node of a mmW module, a mmW signal, the mmW module comprising at least one mmW antenna. The mmW signal can be a signal generated for transmission via the at least one mmW antenna using circuitry of a device, or can be a signal received via the at least one mmW antenna and following a signal path including the mmW signal node to circuitry of the mmW module for processing.

The method 900 includes block 904, which involves receiving, at a heatsink comprising a non-mmW antenna, a non-mmW signal, wherein the heatsink is mechanically coupled to the mmW module at a physical interface. The heatsink can be any structure including a non-mmW antenna described herein, including a heatsink comprising a quarter wave slot antenna, a loop antenna, a monopole antenna, an inverted-F antenna, or any other such antenna.

The method 900 includes block 906, which involves receiving, by the heatsink comprising the non-mmW via the physical interface, thermal energy from the mmW module. The physical interface can include a thermally conductive adhesive, a direct physical contact between the heatsink and the mmW that allows conduction of thermal energy, or any combination of direct contact or any other thermally conductive materials as described herein.

The method 900 includes block 908, which involves dissipating, utilizing the heatsink comprising the non-mmW antenna, the thermal energy received from the mmW module via conduction to a thermal dissipation medium.

Figure 10:
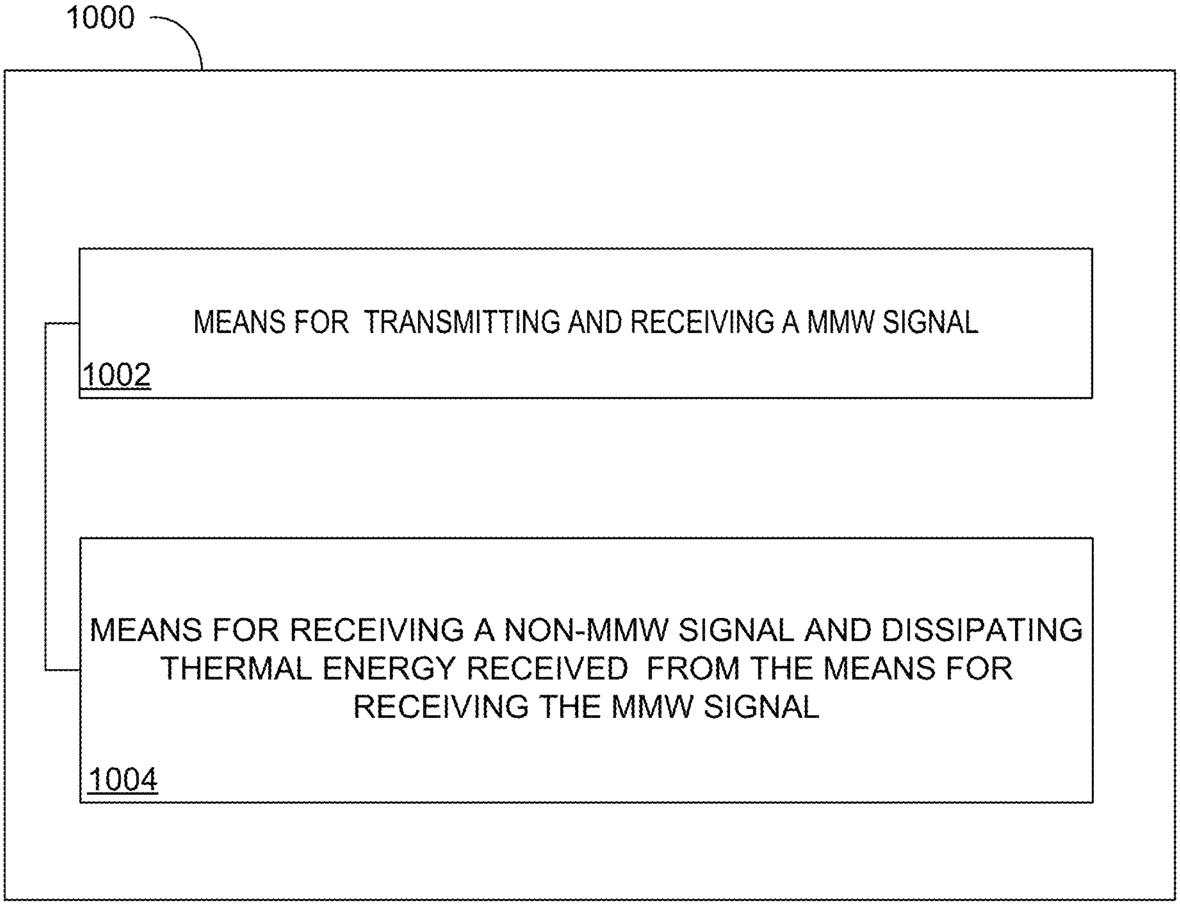
FIG. 10 is a functional block diagram of an apparatus including a mmW module and an integrated heatsink with a non-mmW antenna in accordance with some aspects.

FIG. 10 is a functional block diagram of an apparatus for reflection type phase shifting in accordance with some aspects. The apparatus 1000 comprises means 1002 for transmitting or receiving a mmW signal, and means 1004 for jointly receiving a non-mmW signal and dissipating thermal energy received from the means 1002 for receiving the mmW signal. In some aspects, the means 1002 for receiving the mmW signal is a means for transmitting and/or receiving mmW signals, such an antenna for communication 5G signals, or a radar element used to transmit a radar pulse and/or receive a reflection of the radar pulse that includes information (e.g., data) regarding nearby objects. Radar signals may be processed by radar circuitry in the device 200*a*. In some aspects, the means 1004 for receiving the non-mmW signal is a means for transmitting and/or receiving non-mmW signals, such as a communication antenna. In other implementations, the means 1004 is a GPS antenna configured to receive GPS code patterns. In some aspects, a thermally conductive adhesive is used to physically attach portions of one or more surfaces of the means 1002 for receiving the mmW signal to portions of one or more surfaces of the means 1004 for jointly receiving the non-mmW signal while dissipating the thermal energy received from the means for receiving the mmW signal. Means 1004 for jointly receiving the non-mmW signal and dissipating thermal energy can be any heatsink described herein that comprises a non-mmW antenna, including the heatsinks of FIGS. 3A, 3B, 4A-C, 5A-C, 6, and 7, as well as additional heatsinks described but not specifically illustrated (e.g., heatsinks comprising central slot antennas, etc.).

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmW) band in documents and articles, despite including frequencies outside of the extremely high frequency (EHF) band (30 GHz-300 GHz) which is identified by the International Telecommunications Union (ITU) as a "mmWave" or mmW band.

With the above aspects in mind, unless specifically stated otherwise, it should be understood that the term "sub-7 GHz" or the like if used herein may broadly represent frequencies that may be less than 7 GHz, may be within FR1, or may include mid-band frequencies. Further, unless specifically stated otherwise, it should be understood that the term "mmWave", mmW, or the like if used herein may broadly represent frequencies that may include mid-band frequencies, may be within FR2, or may be within the EHF band.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1: A wireless communication apparatus, comprising: a millimeter wave (mmW) module comprising: at least one mmW antenna; at least one mmW signal node configured to communicate a data signal in association with the at least one mmW antenna; mixing circuitry configured to convert between the data signal and a mmW signal for communications associated with the at least one mmW antenna; and a heatsink comprising a non-mmW antenna, the heatsink further comprising a non-mmW feed point coupled to the non-mmW antenna to provide a signal path to the non-mmW antenna for a non-mmW signal, wherein the heatsink is mechanically coupled to the mmW module.

Aspect 2: The wireless communication apparatus of aspect 1, wherein the at least one mmW antenna is configured to radiate in a first effective beam width from a first side of the mmW module, and wherein the non-mmW antenna is structured with a gap positioned at the first side of the mmW module.

Aspect 3: The wireless communication apparatus of aspect 2, wherein the at least one mmW antenna is configured to radiate mmW signals in the first effective beam width at frequencies greater than 20 gigahertz, and wherein the non-mmW antenna is configured to radiate at frequencies less than 7 gigahertz without interfering with the mmW signals in the first effective beam width.

Aspect 4: The wireless communication apparatus of any of aspects 1 through 3, wherein the heatsink is physically coupled to two or more sides of the mmW module other than the first side using a heat dispersion adhesive.

Aspect 5: The wireless communication apparatus of any of aspects 1 through 4, wherein the heatsink is mechanically coupled to the mmW module to facilitate heat transfer from the mmW module to the non-mmW antenna.

Aspect 6: The wireless communication apparatus of any of aspects 1 through 5, wherein the heatsink is mechanically coupled to the mmW module using a heat dispersion adhesive.

Aspect 7: The wireless communication apparatus of any of aspects 1 through 6, wherein the heatsink is configured to dissipate heat received from the mmW antenna via one or more conductors used to transmit the non-mmW signal.

Aspect 8: The wireless communication apparatus of any of aspects 1 through 7, wherein the heatsink comprises an integral metal structure.

Aspect 9: The wireless communication apparatus of any of aspects 1 through 8, wherein the heatsink is physically connected to a thermal dissipation medium and configured to transfer thermal energy received from the mmW module to the thermal dissipation medium via conduction.

Aspect 10: The wireless communication apparatus of aspect 9, wherein the thermal dissipation medium is air around the non-mmW antenna.

Aspect 11: The wireless communication apparatus of any of aspects 1 through 10, wherein the non-mmW antenna is a quarter wavelength slot antenna with a radiating structure formed by a gap between the heatsink and a frame metal with the feed point structured across the gap between the heatsink and the frame metal.

Aspect 12: The wireless communication apparatus of any of aspects 1 through 10, wherein the non-mmW antenna is an inverted-F antenna comprising a ground plane coupled to a first side of the mmW module and conductors coupled to the ground plane and at least a second side of the mmW module different from the first side of the mmW module.

Aspect 13: The wireless communication apparatus of any of aspects 1 through 10, wherein the non-mmW antenna is a positioning system antenna configured to receive Global Navigation Satellite System signals at approximately 1.575 gigahertz.

Aspect 14: The wireless communication apparatus of any of aspects 1 through 13, wherein the at least one mmW antenna includes a plurality of antennas of an antenna array; wherein the mmW module further comprises phase shifting circuitry for each antenna of the plurality of antennas configurable to transmit or receive a beamformed beam in an effective beam width range.

Aspect 15: The wireless communication apparatus of any of aspects 1 through 14, wherein the mmW module further comprises power management circuitry and mmW circuitry, wherein the power management circuitry is configured to supply system voltages the mmW circuitry.

Aspect 16: The wireless communication apparatus of any of aspects 1 through 10 or 14 through 15, wherein the non-mmW antenna includes a conductor physically coupled to the mmW module, wherein the conductor has a length of approximately 24.1 millimeters.

Aspect 17: The wireless communication apparatus of any of aspects 1 through 10 or 14 through 15, wherein the non-mmW antenna is a quarter wavelength monopole antenna.

Aspect 18: The wireless communication apparatus of any of aspects 1 through 10 or 14 through 15, wherein the non-mmW antenna is a half wavelength loop antenna.

Aspect 19: The wireless communication apparatus of any of aspects 1 through 18, further comprising: a display screen; and control circuitry coupled to the display screen, the non-mmW feed point, and the mmW signal node.

Aspect 20: A method of operating a wireless communication apparatus, comprising: receiving, at a millimeter wave (mmW) signal node of a mmW module, a mmW signal, the mmW module comprising at least one mmW antenna; receiving, at a heatsink comprising a non-mmW antenna, a non-mmW signal, wherein the heatsink is mechanically coupled to the mmW module at a physical interface; receiving, at the heatsink via the physical interface, thermal energy from the mmW module; and dissipating, utilizing the heatsink comprising the non-mmW antenna, the thermal energy received from the mmW module via conduction to a thermal dissipation medium.

Aspect 21: The method of aspect 20, wherein the mmW signal is relayed from the at least one mmW antenna to communication circuitry of the mmW module via the mmW signal node.

Aspect 22: The method of aspect 20, wherein the mmW signal is transmitted via the at least one mmW antenna.

Aspect 23: The method of any of aspects 20 through 22, wherein the non-mmW signal is received at the non-mmW antenna from a non-mmW signal feed for wireless transmission via the non-mmW antenna.

Aspect 24: The method of any of aspects 20 through 22, wherein the non-mmW signal is a wireless global positioning system (GPS) signal received at the non-mmW antenna, and routed to GPS circuitry of the wireless communication apparatus via a non-mmW feed.

Aspect 25: The method of any of aspects 20 through 22, wherein the mmW signal is a reflection of a radar signal received at the mmW antenna, and routed to radar circuitry of the wireless communication apparatus.

Aspect 26: The method of any of aspects 20 through 25, wherein the thermal dissipation medium is air around the non-mmW antenna.

Aspect 27: The method of any of aspects 20 through 25, wherein the thermal dissipation medium is a heat transfer fluid configured to transfer thermal energy from the non-mmW antenna.

Aspect 28: The method of any of aspects 20 through 27, wherein the physical interface comprises a thermally conductive adhesive physically binding portions of one or more surfaces of the heatsink to portions of one or more surfaces of the mmW module.

Aspect 29: An apparatus comprising: means for receiving a mmW signal; and means for jointly receiving a non-mmW signal while dissipating thermal energy received from the means for receiving the mmW signal via thermal conduction.

Aspect 30: The apparatus of claim 29, further comprising a thermally conductive adhesive used to physically attach portions of one or more surfaces of the means for receiving the mmW signal to portions of one or more surfaces of the means for jointly receiving the non-mmW signal while dissipating the thermal energy received from the means for receiving the mmW signal.

Aspect 31: An apparatus comprising means for performing operations according to any of aspects 1 through 19 above.

Aspect 32: A non-transitory computer-readable storage medium comprising instructions stored thereon which, when executed by one or more processors, cause the one or more processors to implement operations according to any of aspects 1 through 29 above.

What is claimed is:

1. A wireless communication apparatus, comprising:

a millimeter wave (mmW) module comprising:

at least one mmW antenna; and at least one mmW signal node configured to communicate a data signal in association with the at least one mmW antenna; and a heatsink comprising a non-mmW antenna and a non-mmW feed point coupled to the non-mmW antenna, the non-mmW feed point configured to provide a signal path to the non-mmW antenna for a non-mmW signal, wherein the heatsink is mechanically coupled to the mmW module.

2. The wireless communication apparatus of claim 1, wherein the at least one mmW antenna is configured to radiate in a first effective beam width from a first side of the mmW module, and wherein the non-mmW antenna is structured with a gap positioned at the first side of the mmW module.

3. The wireless communication apparatus of claim 2, wherein the at least one mmW antenna is configured to radiate mmW signals in the first effective beam width at frequencies greater than 20 gigahertz, and wherein the non-mmW antenna is configured to radiate at frequencies less than 7 gigahertz without interfering with the mmW signals in the first effective beam width.

4. The wireless communication apparatus of claim 2, wherein the heatsink is physically coupled to two or more sides of the mmW module other than the first side using a heat dispersion adhesive.

5. The wireless communication apparatus of claim 1, wherein the heatsink is mechanically coupled to the mmW module to facilitate heat transfer from the mmW module to the non-mmW antenna.

6. The wireless communication apparatus of claim 1, wherein the heatsink is mechanically coupled to the mmW module using a heat dispersion adhesive.

7. The wireless communication apparatus of claim 1, wherein the heatsink is configured to dissipate heat received from the at least one mmW antenna via one or more conductors used to transmit the non-mmW signal.

8. The wireless communication apparatus of claim 1, wherein the heatsink comprises an integral metal structure.

9. The wireless communication apparatus of claim 1, wherein the heatsink is physically connected to a thermal dissipation medium and configured to transfer thermal energy received from the mmW module to the thermal dissipation medium via conduction.

10. The wireless communication apparatus of claim 9, wherein the thermal dissipation medium is air around the non-mmW antenna.

11. The wireless communication apparatus of claim 1, wherein the non-mmW antenna is a quarter wavelength slot antenna with a radiating structure formed by a gap between the heatsink and a frame metal with the non-mmW feed point structured across the gap between the heatsink and the frame metal.

12. The wireless communication apparatus of claim 1, wherein the non-mmW antenna is an inverted-F antenna comprising a ground plane coupled to a first side of the mmW module and conductors coupled to the ground plane and at least a second side of the mmW module different from the first side of the mmW module.

13. The wireless communication apparatus of claim 1, wherein the non-mmW antenna is a positioning system antenna configured to receive Global Navigation Satellite System signals at approximately 1.575 gigahertz.

14. The wireless communication apparatus of claim 1, wherein the at least one mmW antenna includes a plurality of antennas of an antenna array;

wherein the mmW module further comprises phase shifting circuitry for each antenna of the plurality of antennas configurable to transmit or receive a beamformed beam in an effective beam width range.

15. The wireless communication apparatus of claim 1, wherein the mmW module further comprises power management circuitry and mmW circuitry, wherein the power management circuitry is configured to supply system voltages to the mmW circuitry.

16. The wireless communication apparatus of claim 1, wherein the non-mmW antenna includes a conductor physically coupled to the mmW module, wherein the conductor has a length of approximately 24.1 millimeters.

17. The wireless communication apparatus of claim 1, wherein the non-mmW antenna is a quarter wavelength monopole antenna, or wherein the non-mmW antenna is a half wavelength loop antenna.

18. The wireless communication apparatus of claim 1, further comprising:

a display screen; and control circuitry coupled to the display screen, the non-mmW feed point, and the at least one mmW signal node.

19. The wireless communication apparatus of claim 1, wherein the heatsink is external to the mmW module.

20. The wireless communication apparatus of claim 1, wherein the mmW module further comprises mixing circuitry configured to convert between the data signal and a mmW signal for communications associated with the at least one mmW antenna.

21. The wireless communication apparatus of claim 1, further comprising a ground separate from the mmW module, and wherein the non-mmW antenna comprises a radiating structure coupled to the ground.

22. A method of operating a wireless communication apparatus, comprising:

receiving, at a millimeter wave (mmW) signal node of a mmW module, a mmW signal, the mmW module comprising at least one mmW antenna;

receiving, at a heatsink comprising a non-mmW antenna, a non-mmW signal, wherein the heatsink is mechanically coupled to the mmW module at a physical interface;

receiving, at the heatsink via the physical interface, thermal energy from the mmW module; and dissipating, utilizing the heatsink comprising the non-mmW antenna, the thermal energy received from the mmW module via conduction to a thermal dissipation medium.

23. The method of claim 22, wherein the mmW signal is relayed from the at least one mmW antenna to communication circuitry of the mmW module via the mmW signal node.

24. The method of claim 22, wherein the mmW signal is transmitted via the at least one mmW antenna.

25. The method of claim 22, wherein the non-mmW signal is received at the non-mmW antenna from a non-mmW signal feed for wireless transmission via the non-mmW antenna.

26. The method of claim 22, wherein the non-mmW signal is a wireless global positioning system (GPS) signal received at the non-mmW antenna, and routed to GPS circuitry of the wireless communication apparatus via a non-mmW feed.

27. The method of claim 22, wherein the mmW signal is a reflection of a radar signal received at the at least one mmW antenna, and routed to radar circuitry of the wireless communication apparatus.

28. The method of claim 22, wherein the thermal dissipation medium is air around the non-mmW antenna.

29. The method of claim 22, wherein the thermal dissipation medium is a heat transfer fluid configured to transfer thermal energy from the non-mmW antenna.

30. The method of claim 22, wherein the physical interface comprises a thermally conductive adhesive physically binding portions of one or more surfaces of the heatsink to portions of one or more surfaces of the mmW module.

* * * * *